(12) United States Patent
Brizzi et al.

(10) Patent No.: US 12,229,982 B2
(45) Date of Patent: Feb. 18, 2025

(54) OFFLINE OPTIMIZATION OF SENSOR DATA FOR AGENT TRAJECTORIES

(71) Applicant: Lyft, Inc., San Francisco, CA (US)

(72) Inventors: Filippo Brizzi, London (GB); Luca del Pero, London (GB); Tayyab Naseer, London (GB); Lorenzo Peppoloni, London (GB)

(73) Assignee: Lyft, Inc., San Francisco, CA (US)

( * ) Notice: Subject to any disclaimer, the term of this patent is extended or adjusted under 35 U.S.C. 154(b) by 748 days.

(21) Appl. No.: 17/190,312

(22) Filed: Mar. 2, 2021

(65) Prior Publication Data

US 2022/0284619 A1 Sep. 8, 2022

(51) Int. Cl.

| | |
|---|---|
| *G06T 7/70* | (2017.01) |
| *G06F 18/22* | (2023.01) |
| *H04N 13/204* | (2018.01) |
| *B60W 10/18* | (2012.01) |
| *B60W 10/20* | (2006.01) |
| *B60W 30/00* | (2006.01) |
| *B60W 60/00* | (2020.01) |

(52) U.S. Cl.
CPC ............... *G06T 7/70* (2017.01); *G06F 18/22* (2023.01); *H04N 13/204* (2018.05); *B60W 10/18* (2013.01); *B60W 10/20* (2013.01); *B60W 30/00* (2013.01); *B60W 60/001* (2020.02); *B60W 2420/403* (2013.01); *G06T 2207/10016* (2013.01); *G06T 2207/30241* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 10,882,522 B2 * | 1/2021 | Rosman | G06V 20/58 |
| 11,961,304 B2 * | 4/2024 | Peppoloni | G06T 7/277 |
| 2020/0086863 A1 * | 3/2020 | Rosman | G06V 20/58 |
| 2020/0349366 A1 * | 11/2020 | Takemura | H04N 13/286 |
| 2021/0397854 A1 * | 12/2021 | Brizzi | G06T 7/70 |
| 2021/0405641 A1 * | 12/2021 | Agon | B60W 40/072 |
| 2022/0012503 A1 * | 1/2022 | Peppoloni | G06V 20/56 |

(Continued)

*Primary Examiner* — Akwasi M Sarpong
*Assistant Examiner* — Pawan Dhingra
(74) *Attorney, Agent, or Firm* — Lee Sullivan Shea & Smith LLP

(57) ABSTRACT

Examples disclosed herein involve a computing system configured to (i) based on image data captured by a vehicle in an environment, obtain observations of a time-sequence of positions of an agent identified within the image data, (ii) generate a first updated time-sequence of positions of the agent by performing a first optimization operation that includes processing the observed time-sequence of positions by beginning with a position associated with an observation having the highest confidence in the time-sequence of observations and proceeding in a first direction, (iii) after generating the first updated time-sequence of positions, generate a second updated time-sequence of positions of the agent by performing a second optimization operation that includes processing the first updated time-sequence of positions in a second direction opposite the first direction, and (iv) derive a trajectory for the agent in the environment based on the second updated time-sequence of positions for the agent.

20 Claims, 15 Drawing Sheets

(56) References Cited

U.S. PATENT DOCUMENTS

| | | | |
|---|---|---|---|
| 2022/0012899 A1* | 1/2022 | Peppoloni | G06T 7/246 |
| 2022/0028262 A1* | 1/2022 | Devassy | G08G 1/202 |
| 2022/0066459 A1* | 3/2022 | Jain | G06N 3/047 |
| 2022/0153310 A1* | 5/2022 | Yang | G05D 1/0221 |

* cited by examiner

OFFLINE OPTIMIZATION OF SENSOR DATA FOR AGENT TRAJECTORIES

BACKGROUND

Vehicles are increasingly being equipped with sensors that capture sensor data while such vehicles are operating in the real world, and this captured sensor data may then be used for many different purposes, examples of which may include building an understanding of how vehicles and/or other types of agents (e.g., pedestrians, bicyclists, etc.) tend to behave within the real world and/or creating maps that are representative of the real world. The sensor data that is captured by these sensor-equipped vehicles may take any of various forms, examples of which include Global Positioning System (GPS) data, Inertial Measurement Unit (IMU) data, camera image data, Light Detection and Ranging (LiDAR) data, Radio Detection And Ranging (RADAR) data, and/or Sound Navigation and Ranging (SONAR) data, among various other possibilities.

SUMMARY

In one aspect, the disclosed technology may take the form of a method that involves (i) based on image data captured by a vehicle in an environment, obtaining observations of a time-sequence of positions of an agent identified within the image data, (ii) generating a first updated time-sequence of positions of the agent by performing a first optimization operation on the observed time-sequence of positions, wherein the first optimization operation includes processing at least two or more positions of the observed time-sequence of positions by beginning with a position associated with an observation having the highest confidence in the time-sequence of observations and proceeding in a first direction, (iii) after generating the first updated time-sequence of positions, generating a second updated time-sequence of positions of the agent by performing a second optimization operation on the first updated time-sequence of positions, wherein the second optimization operation includes processing at least two or more positions of the first updated time-sequence of positions in a second direction opposite the first direction, and (iv) deriving a trajectory for the agent in the environment based on the second updated time-sequence of positions for the agent.

In some example embodiments, obtaining the observations of the time-sequence of positions of the agent may involve (i) tracking observations of the agent identified across a series of image frames within the image data, (ii) assigning a common agent identifier (ID) to each of the tracked observations of the agent, and (iii) assembling the tracked observations comprising the common agent ID into the observations of the time-sequence of positions.

Further, in example embodiments, tracking the observations of the agent identified across the series of image frames within the image data may involve (i) based on (a) one or more respective prior positions associated with the one or more previous observations of the agent and (b) a motion model for the agent, determining a predicted position of the agent, and (ii) determining a match between the predicted position of the agent and a future observation of the agent based on (a) an intersection of the predicted position of the agent and the future observation of the agent, and (b) a visual matching analysis of the predicted position of the agent with the future observation of the agent.

Further yet, in example embodiments, the method may involve determining a respective measurement error associated with each observation in the observations of the time-sequence of positions that is based on a measured distance of the positions from the vehicle and incorporating the respective error value associated with each observation into at least the first optimization operation or the second optimization operation. In some cases, the respective error value may increase quadratically as the measured distance from the vehicle increases.

Still further, in some example embodiments, the method may involve augmenting the second updated time-sequence of observations to include one or more additional intermediate observations between each pair of observations in the second updated time-sequence of observations. In some cases, the image data may be captured by a stereo camera having a frame rate of 5 frames per second, and augmenting the second updated time-sequence of observations may involve increasing the frame rate of the second updated time-sequence of observations from 5 frames per second to 30 frames per second.

Still further, in some example embodiments, beginning with the position associated with the observation having the highest confidence in the time-sequence of observations and proceeding in the first direction may involve (a) determining that one of (a) an earliest position in the time-sequence of positions or (b) a latest position in the time-sequence of position is the position of the agent associated with the observation having the highest confidence in the time-sequence of observations based on the measured distance of each respective position from the vehicle, and (ii) proceeding (a) chronologically forward or (b) chronologically backward, respectively.

Still further, in some example embodiments, generating the first updated time-sequence of positions of the agent may involve processing at least two or more positions of the observed time-sequence of positions by beginning with a position associated with an earliest observation in the time-sequence of observations and proceeding chronologically forward, and generating the second updated time-sequence of positions of the agent may involve processing at least two or more positions of the first updated time-sequence of observations by beginning with a position associated with a latest observation and proceeding chronologically backward.

Still further, in some example embodiments, performing the first optimization operation on the observed time-sequence of positions may involve (i) based on (a) an initial observed position in the time-sequence of positions and (b) a motion model for the agent, determining a next predicted position for the agent, (ii) based on (a) a next observed position for the agent and (b) the next predicted position for the agent, determining an updated next position for the agent having a higher confidence than the next observed position for the agent, and (iii) using the updated next position for the agent as a next initial observed position in the time-sequence of positions to thereby determine the first updated time-sequence of positions.

In another aspect, the disclosed technology may take the form of a computing system comprising at least one processor, a non-transitory computer-readable medium, and program instructions stored on the non-transitory computer-readable medium that are executable by the at least one processor such that the computing system is configured to carry out the functions of the aforementioned method.

In yet another aspect, the disclosed technology may take the form of a non-transitory computer-readable medium comprising program instructions stored thereon that are executable to cause a computing system to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

DETAILED DESCRIPTION

Figure 1A:
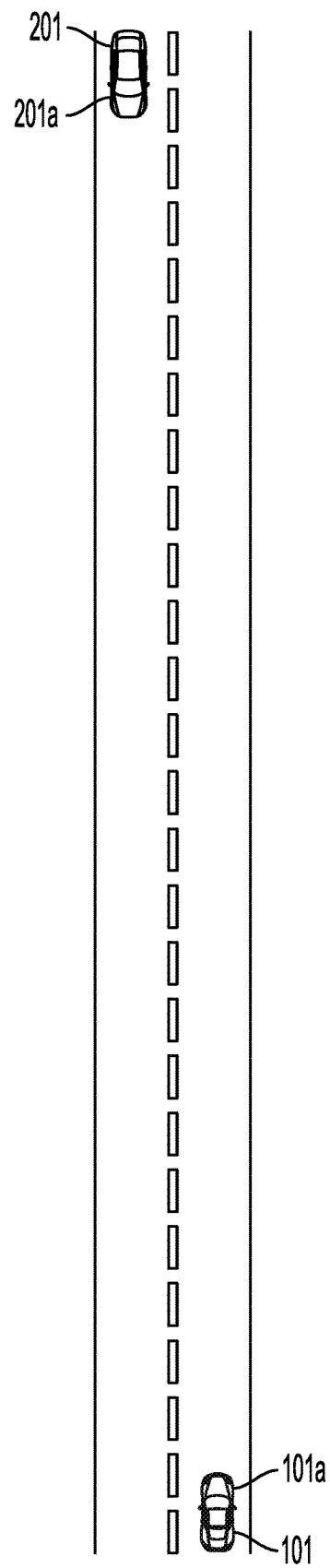
FIG. 1A is a diagram that illustrates an example vehicle that includes a camera-based sensor system and an observed position of an agent.

Information regarding the prior behavior of vehicles or other types of agents within the real world can be used to help facilitate and improve various aspects of technology, in various ways. One specific example of this information is prior trajectories for vehicles and/or other types of agents in the real world. As used herein, a "trajectory" for an agent generally refers to a representation of the agent's motion and location within the real world over the course of some period of time, which may take the form of a time-sequence of position and orientation (or "pose") values for the agent, among other possibilities.

For instance, as one possibility, prior agent trajectories can be used to train machine learning models that are employed by an on-board computing system of a vehicle (e.g., a vehicle equipped with autonomy systems and/or advanced driver assistance systems) during operation, such as machine learning models for predicting the future trajectories of surrounding agents that are detected by a vehicle's on-board computing system, and/or machine learning models for planning the vehicle's behavior based on the predicted trajectories. As another possibility, prior agent trajectories can be encoded as pre-processed information about the world (e.g., encoded as map data) that can be used by an on-board computing system of a vehicle during perception, prediction, and planning operations.

It should be understood that prior trajectories of agents can also be used to improve other technology areas as well.

However, it will be appreciated that an extensive and diverse set of prior agent trajectories of sufficient accuracy will generally need to be collected before such improvements can be achieved at scale. For example, if the goal is to use prior agent trajectories to train machine learning models utilized by on-board computing systems to carry out operations such as perception, prediction, and/or planning, then sufficiently accurate prior agent trajectories will need to be collected for a wide range of different circumstances that could potentially be faced by a vehicle. Unfortunately, it is difficult or impossible to meet these needs using existing approaches for collecting prior agent trajectories.

Indeed, one existing approach for collecting prior agent trajectories makes use of vehicles that are equipped with the types of expensive, LiDAR-based sensor systems typically found on autonomous or semi-autonomous vehicles (AVs), which typically comprises a LiDAR unit combined with a 360° camera array and telematics sensors. As each of these vehicles is driven within a given area of the real world (typically by humans, but perhaps also with some level of autonomous operation), the vehicle's LiDAR-based sensor system captures high-fidelity sensor data that is indicative of the movement and location of the vehicle as well as other agents surrounding the vehicle within the given area. Processing may then be applied to this high-fidelity sensor data to derive trajectories for the vehicle and the other surrounding agents. Beneficially, the trajectories that are collected in this manner generally have a very high degree of accuracy, on the order of centimeter-level precision. However, the total number of these types of vehicles that currently exist in the world is relatively small, both because equipping vehicles with a LiDAR-based sensor system is expensive and currently provides limited practical value outside of high-fidelity data collection and autonomous driving, and also because these types of vehicles are typically only found in a limited subset of geographic areas (e.g., cities where autonomous technology is being tested). As a result, highly accurate prior agent trajectories cannot be collected on a large enough scale using these types of vehicles alone.

Because of this, efforts are being made to develop approaches for collecting prior agent trajectories without the use of such vehicles. For instance, efforts are currently being made to develop approaches that enable prior agent trajectories to be collected using vehicles equipped with sensors that are less expensive and/or more widely available than the types of expensive LiDAR-based sensor systems typically found on AVs, examples of which may include camera-based sensor systems including a monocular and/or stereo camera combined with telematics sensors. As above, these new approaches for collecting trajectories using vehicles equipped with these other types of sensor systems generally involve deploying such sensor-equipped vehicles to capture sensor data that is indicative of the movement and location of the vehicles and other agents surrounding the vehicles in the real world and then applying processing to this captured sensor data in order to derive trajectories for the vehicles and surrounding agents.

Beneficially, these new approaches will allow prior agent trajectories to be collected on a much larger scale than an approach that relies only on vehicles equipped with expensive, LiDAR-based sensor systems. However, the collected sensor data, and prior agent trajectories derived therefrom, using these other types of sensor systems are likely to have a lower degree of accuracy than those collected using LiDAR-based sensor systems, given the differences in sensor fidelity. For example, many camera-based sensor systems have an accuracy on the order of meter-level precision, with a margin of error that may increase the further an agent is from the camera-based sensor system. As another example, the sensor data captured by a monocular or stereo camera may be more prone to occlusions, obstructions, or other artifacts in the captured images than sensor data captured by a LiDAR-based sensor system, which may lead to missing observations, or gaps, in the sequence of observations for a given agent. Accordingly, these factors present additional challenges that need to be addressed before the sensor data and prior agent trajectories derived therefrom can be used for the purposes noted above, many of which require the higher levels of accuracy typically associated with LiDAR-based sensor systems.

Some possible examples of the problems that may arise from using more widely-available, but relatively less accurate, camera-based sensor systems to capture sensor data and derive prior agent trajectories is illustrated in FIGS. 1A-1E. As shown in FIG. 1A, an example vehicle 101 that is equipped with a camera-based sensor system is approaching another vehicle 201 that is travelling in the opposite direction. For purposes of this example, FIG. 1A may represent a first time at which the vehicle 101 captures sensor data (e.g., image data) from which the vehicle 201 is identified. As such, the location of the vehicle 201 in FIG. 1A may represent the observed location of the vehicle 201 within the captured sensor data of the vehicle 101, and may be subject to a certain degree of error, as discussed above.

Figure 1B:
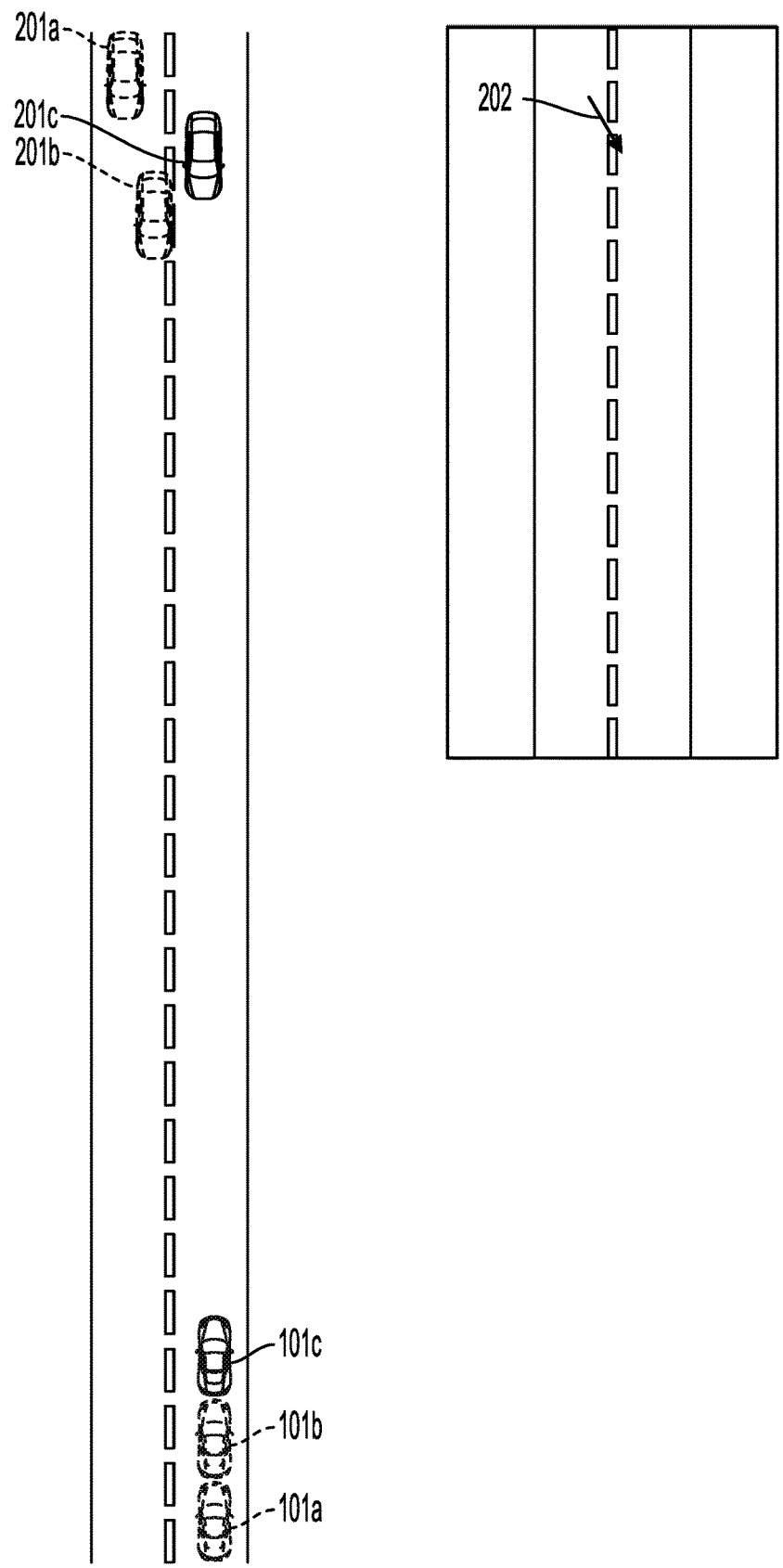
FIG. 1B is a diagram that illustrates the example vehicle of FIG. 1A and additional observed positions of the agent.

Turning to FIG. 1B, the vehicle 101 is shown at a later time having progressed from a first position 101a to a second position 101b and then a third position 101c. FIG. 1B also depicts corresponding observations 201a, 201b, and 201c of the vehicle 201 that are captured by the camera-based sensor system of the vehicle 101. However, because the vehicle 201 remains relatively far away from the vehicle 101, each of these observations may have a relatively high degree of error, particularly with respect to the observed distance (i.e., depth) from the vehicle 201, which tends to be associated with increased noise as its value increases. Indeed, as shown in FIG. 1B, the third observation 201c of vehicle 201 appears further away from the vehicle 101 than the second observation 201b. This represents an unlikely situation and demonstrates the relatively low confidence that may be associated with such observations.

Accordingly, an agent trajectory that is derived for the vehicle 201 based on the captured sensor data shown in FIG. 1B, such as the example trajectory 202, may have similarly low confidence and would not be suitable for many of the uses noted above, such as training machine learning models that are employed by an on-board computing system of a vehicle. For instance, if an autonomy system were to undertake a simulated driving operation using the sensor data captured by vehicle 101 as simulated sensor input, the autonomy system may not be able to use the derived trajectory 202 to confidently predict the behavior of vehicle 201 at the time shown in FIG. 1B. Further, the autonomy system also may not be able to confidently plan the driving operations of a vehicle in the position of vehicle 101.

Figure 1C:
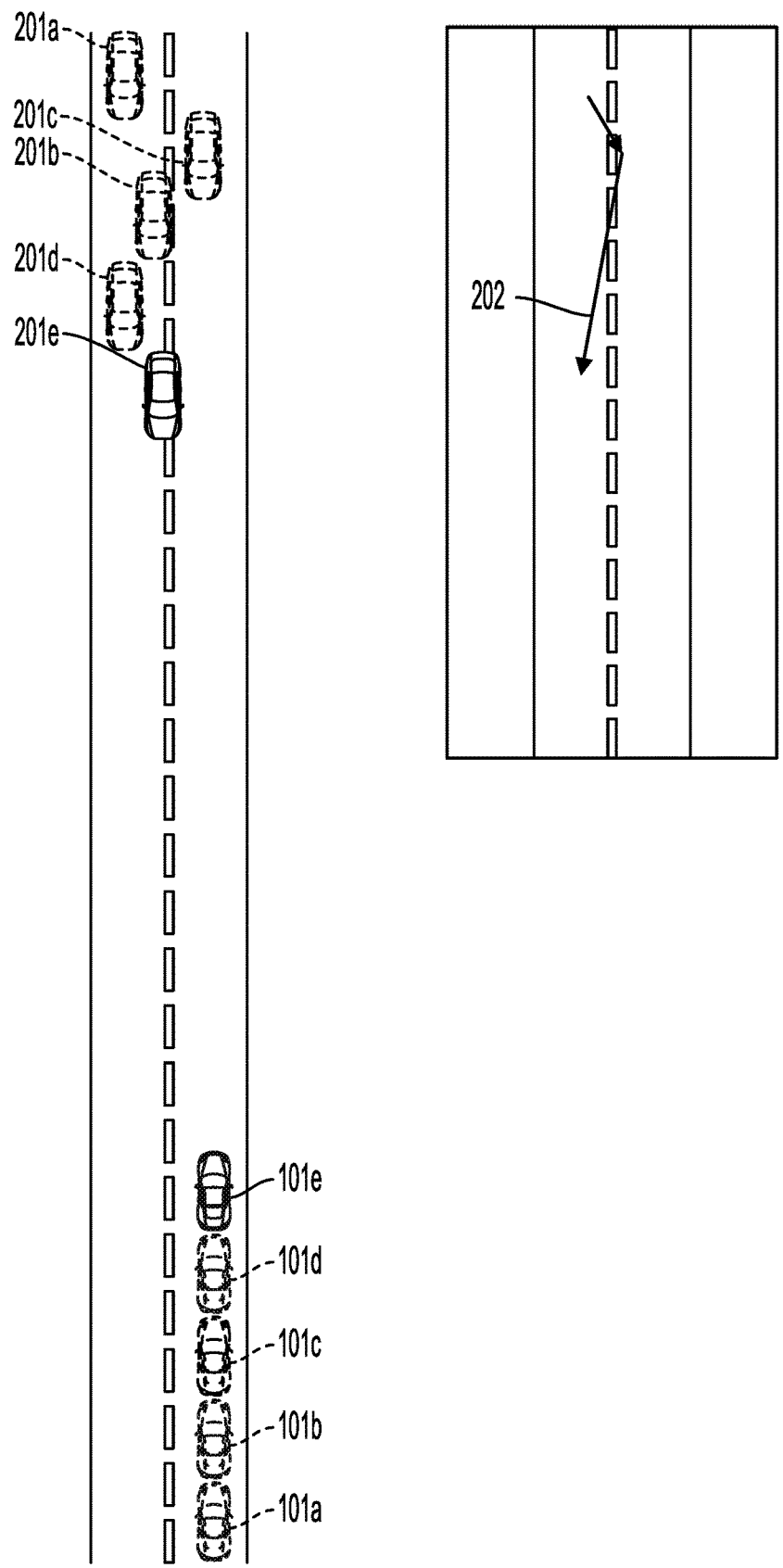
FIG. 1C is a diagram that illustrates the example vehicle of FIGS. 1A-1B and additional observed positions of the agent.
Figure 1D:
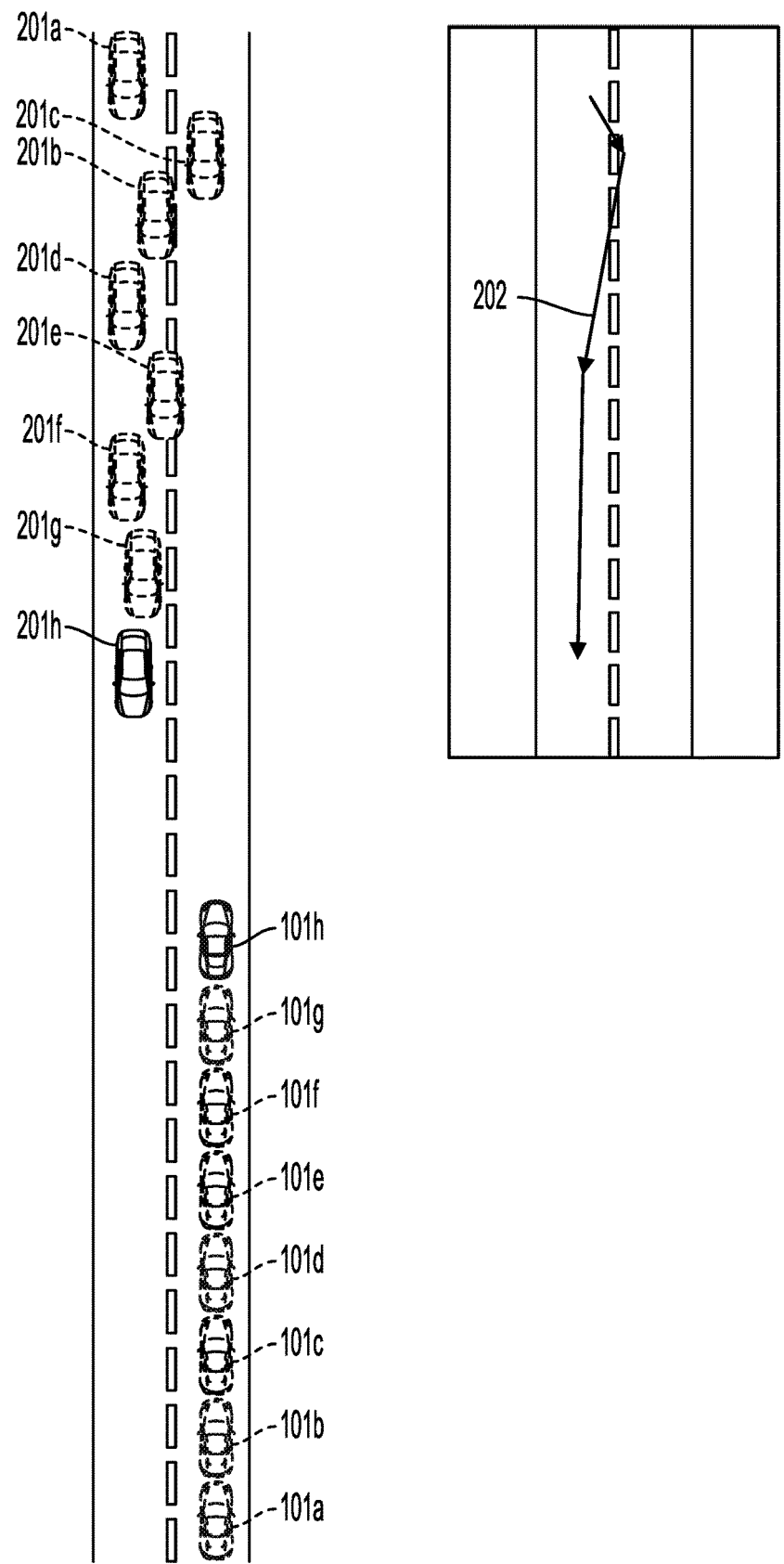
FIG. 1D is a diagram that illustrates the example vehicle of FIGS. 1A-1C and additional observed positions of the agent.

FIG. 1C illustrates the vehicle 101 at a later time where the vehicle 101 has progressed to a fourth position 101d and then a fifth position 101e, and has captured corresponding observations 201d and 201e of the vehicle 201. Using the new observations, the derived trajectory 202 for the vehicle 201 may be updated with an additional time-sequence of positions as shown. Finally, FIG. 1D illustrates the vehicle 101 at a still later time where the vehicle 101 has progressed to positions 101f, 101g, and 101h, and has captured corresponding observations 201f, 201g, and 201h of the vehicle 201. Using these additional observations, the derived trajectory 202 for the vehicle 201 may be further updated with the additional time-sequence of positions.

Based on the entire set of observations of vehicle 201 shown in FIG. 1D, which may be associated with an increasing degree of confidence as the overall distance between vehicle 101 and vehicle 201 decreases, it can be seen that the earliest observations (e.g., observations 101a-101c) were affected by a relatively high degree of error. As a result, any prediction and/or planning operations that are performed by an autonomy system based on the sensor data available at the prior time shown in FIG. 1B would be based on inaccurate observations of the vehicle 201. Accordingly, the raw sensor data as captured by the vehicle 101 is unsuitable for training machine learning models for such prediction and planning operations.

Figure 1E:
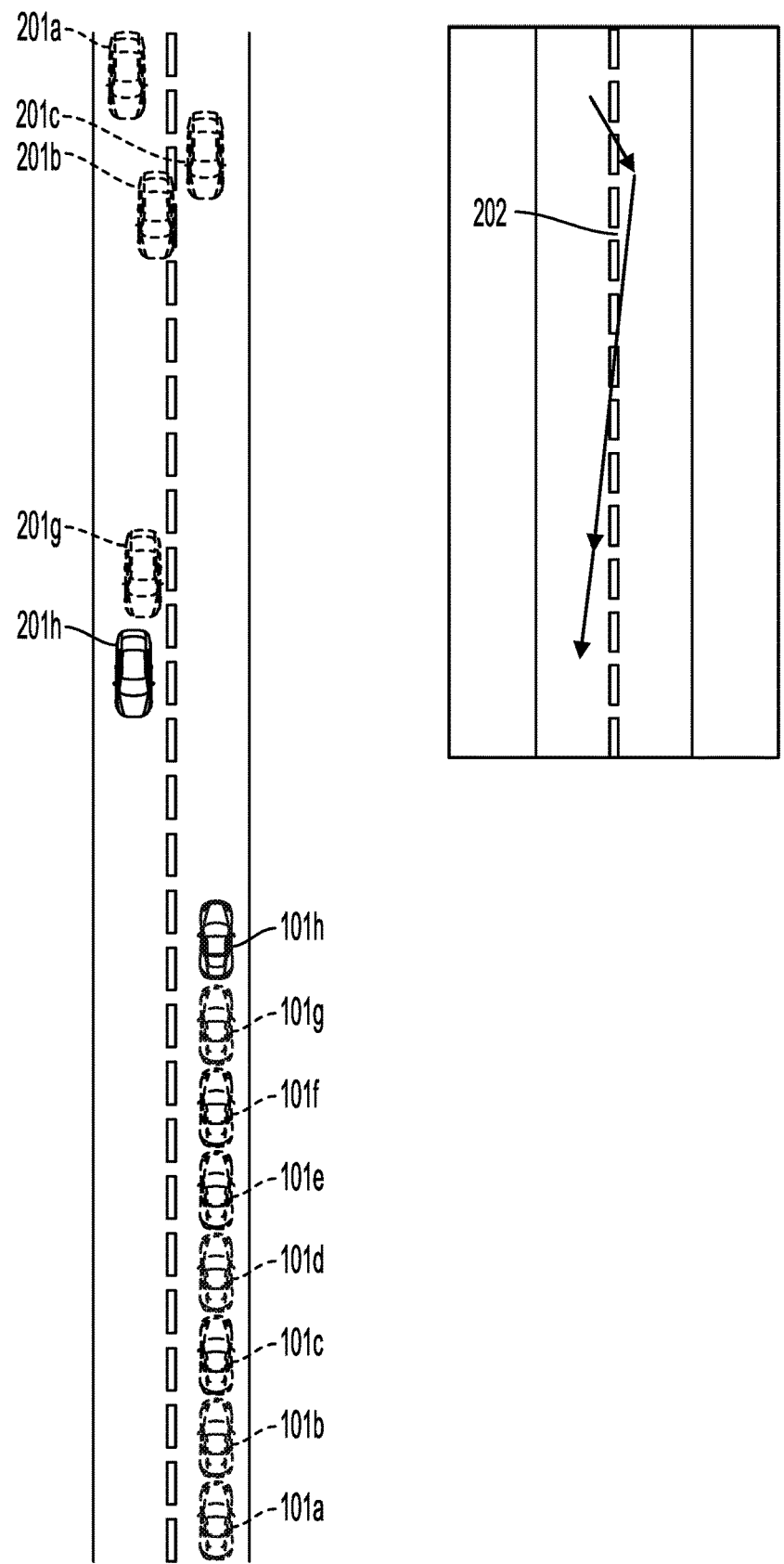
FIG. 1E is a diagram that illustrates another example of the vehicle of FIGS. 1A-1D including gaps in the observed positions of the agent.

FIG. 1E depicts a variation of the example discussed above in FIGS. 1A-1D and illustrates another problem that may arise from using more widely-available, but relatively less accurate, camera-based sensor systems to capture sensor data and derive prior agent trajectories. For instance, FIG. 1E includes the same vehicle 101 and vehicle 201 as discussed above. However, in the image data captured by the vehicle 101, observations 201d-201f are missing, leaving a gap in the sequence of observations for vehicle 201. As noted above, these missing observations might be caused by occlusions or other artifacts in the captured image data at each of the associated times, preventing or otherwise hindering the detection of vehicle 201 in those individual image frames. As can be seen from the derived trajectory 202 shown in FIG. 1E, the gap in the observations of vehicle 201 leads to even greater error, as the quality of the trajectory cannot be improved by the intermediate observations 201d-201f that are missing. For this additional reason, the raw sensor data as captured by the vehicle 101 is unsuitable for training machine learning models for prediction and planning operations.

For these reasons, it would be beneficial to improve the quality of sensor data that is captured by relatively lower-quality sensor systems, such as camera-based sensor systems, so as to increase the confidence associated with the sensor data and the trajectories derived therefrom. However, current approaches do not provide an efficient way to accomplish this.

In view of these and other shortcomings associated with existing approaches for collecting agent trajectories derived from relatively lower quality sensor data, disclosed herein are new techniques for improving the accuracy of such sensor data based on an offline, wholistic analysis of the collected sensor data.

According to one possible implementation, the techniques involve deriving, from a sensor-equipped vehicle's previously captured image data, a detected agent's trajectory based on both a future-looking and a past-looking analysis of the agent's observed position with respect to the vehicle over time. This analysis may utilize one or more optimization algorithms in an offline setting. Notably, this may allow for the raw observations of a given agent in the captured sensor data to be optimized in a two-step process that includes both a forward optimization (e.g., in chronological order) as well as a backward optimization (e.g., reverse chronological order), which effectively allows the optimization to consider future observed positions of the agent. This, in turn, may allow for higher confidence observations of the agent, such as observations nearer to the vehicle, to be used during optimization to make relatively high-confidence predictions regarding the agent's position and thereby reduce the noise in observations that have lower confidence, such as observations further away from the vehicle. As such, this may provide advantages over techniques for generating agent trajectories from raw sensor data that only incorporate the past and present observed positions of the agent (e.g., deriving trajectories progressively during simulated or actual operation), which are generally shown in FIGS. 1A-1E.

The example optimization algorithms discussed herein may take various forms. As one possibility, a Kalman filter may be utilized that receives as inputs (i) a time-sequence of positions for a given agent, (ii) a motion model that describes the expected kinematic behavior of the agent (e.g., a constant velocity model), and (iii) an uncertainty metric that defines the error associated with each individual observation. For instance, the uncertainty metric may be defined such that the expected error of each measured position of the agent increases as a function of the measurement distance from the vehicle. Other representations of the measurement uncertainty may also be used. Other optimization algorithms are possible as well.

Figure 2:
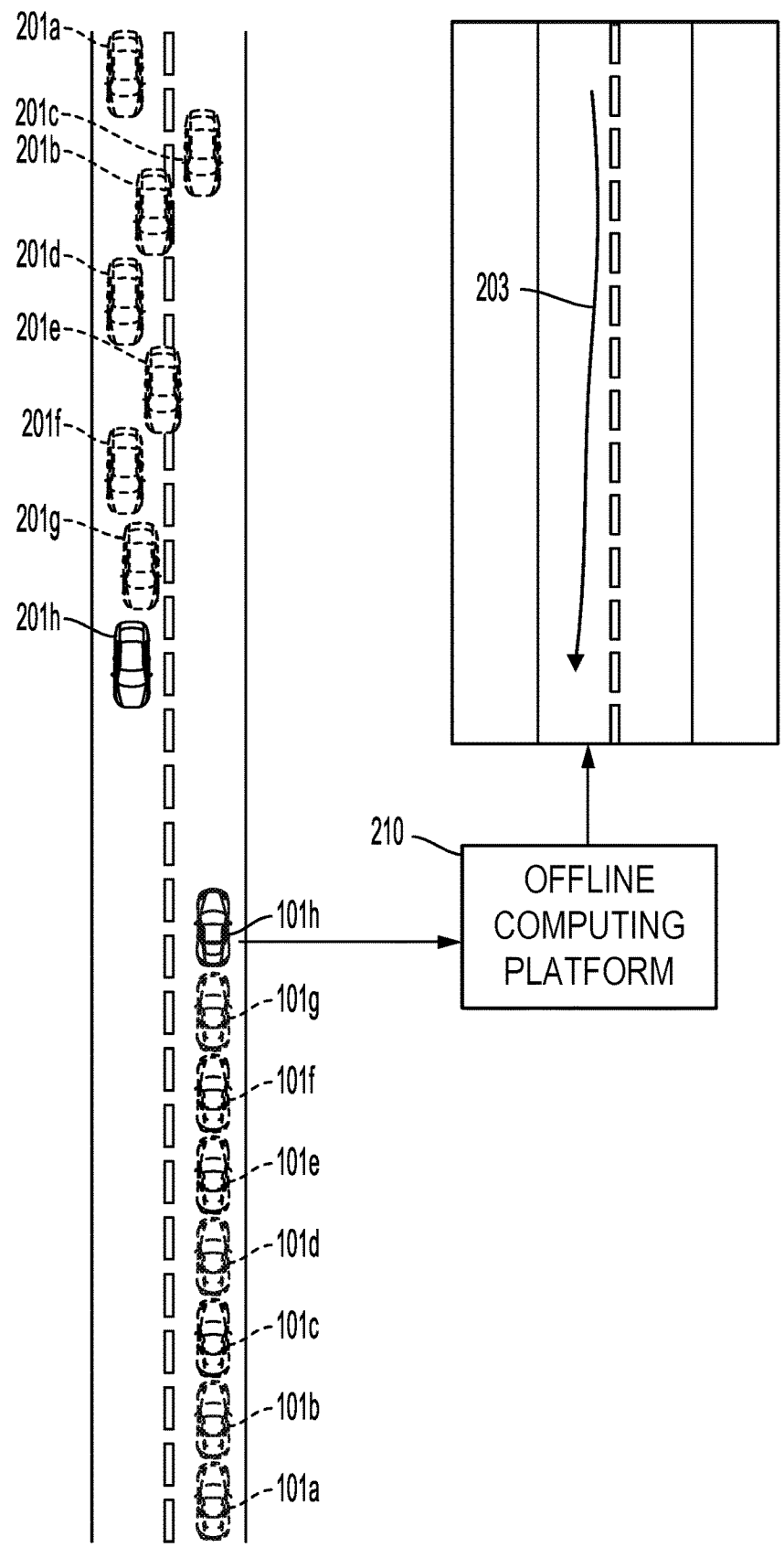
FIG. 2 is a diagram that illustrates the example vehicle of FIGS. 1A-1E and all observed positions of the agent.

Turning to FIG. 2, one example of deriving an improved agent trajectory based on both a future-looking and a past-looking analysis of the agent's observed position is shown. FIG. 2 depicts the same vehicle 101 and the vehicle 201 shown in FIGS. 1A-1D, as well as the full time-sequence of observations of vehicle 201 that were captured by the camera-based sensor system of vehicle 101. However, rather than the trajectory 202 shown in FIG. 1D that was incrementally derived, incorporating the error in the observed positions of the vehicle 201 at each given time, an offline computing system may perform the optimization techniques discussed herein across the entire time-sequence of positions for the vehicle 201 to derive the smoothed trajectory 203 shown in FIG. 2.

In one example implementation, the computing system may derive the trajectory 203 by performing a first optimization operation that utilizes a backward Kalman filter beginning from the latest observation 201h of the vehicle 201. This observation 201h may possess the least uncertainty based on its distance from the vehicle 101, and may therefore provide the basis, along with the motion model as input to the Kalman filter, for a relatively high-confidence prediction for the "next" observed position of the vehicle 201. In this regard, the "next" observed position of the vehicle 201 is actually the previously observed position, chronologically speaking, because the Kalman filter is proceeding the backwards direction.

Thus, the relatively high-confidence prediction that is based on observation 201h may be compared with the observed position of the vehicle 201 at observation 201g, and the Kalman filter may then update the prediction based on the measured position of the vehicle 101 at observation 201g. For example, the observation 201g may be afforded less weight, based on its respective distance from the vehicle 101, than the predicted value that is derived from the relatively higher confidence observation 201h. In this way, the optimization will automatically utilize the benefit of more accurate, higher-confidence observations nearer to the vehicle 101 to reduce the error associated with more distant observations.

Following the same process, the backward Kalman filter will proceed with a next prediction starting not from the observation 201g, but rather from the more accurate, updated prediction from the previous step that incorporates the greater accuracy associated with observation 201h. This next prediction will be compared with the "next" observation at 201f, will be respectively updated, and so on, with the original measurement error being reduced at each observation.

In this regard, FIG. 2 may also illustrate how the techniques discussed herein provide an improvement over the problems discussed above in FIG. 1E. For instance, the relatively higher confidence observations 201h and 201g may be used as a basis to derive the trajectory 203 during the period where there was a gap in the observations and in some cases, may be used to fill in the gap with one or more simulated observations that are consistent with the optimized, higher-confidence observations.

When the backward Kalman filter concludes, the computing system may then perform a second optimization operation that utilizes a forward Kalman filter. In this regard, the second optimization operation may utilize as its input observations the more accurate, updated predictions (and their associated confidence levels) that were output at each respective step of the first optimization operation. The forward Kalman filter will proceed in the opposite direction (e.g., chronologically) in a similar fashion as discussed above, utilizing the motion model to generate predictions and then updating each prediction according to a weighted comparison of the prediction to the subsequent input observation.

Upon completing the first and second optimization operations (sometimes referred to as "smoothing" operations), the computing system may determine an estimated time-sequence of positions for the vehicle 201 that reduces the error associated with the raw observations captured by the camera-based sensor system of vehicle 101. This more accurate time-sequence of positions may then be used by the computing system to derive the similarly more accurate trajectory 203 for the vehicle 201 shown in FIG. 2. As a result, the trajectory 203 may be suitable for substantially more uses, including as training data for machine learning models or predicting and planning by an onboard computing system.

For example, in contrast to the trajectory 202 shown in FIGS. 1A-1D or FIG. 1E, the trajectory 203 shown in FIG. 2 has greater accuracy and may be used, even when the vehicle 201 is relatively distant from the vehicle 101, as a basis to reliably predict the driving behavior of vehicle 201. This, in turn, may allow an onboard computing system to reliably plan the driving operations of a simulated vehicle in the position of vehicle 101.

The techniques for offline optimization of captured sensor data discussed herein may provide other benefits to deriving agent trajectories as well. For instance, although it is not illustrated in the simplified example shown in FIGS. 1A-2 and discussed above, deriving agent trajectories typically involves an initial data association step whereby each agent in the vehicle's surrounding environment is identified and associated with an agent identifier, or agent ID, in each frame of the captured sensor data. Under ideal conditions, a given agent will be identified with the same agent ID across a time-sequence of observations of the agent (sometimes referred to as a "track" for the agent). However, many factors can make agent tracking a challenging task, such as non-agent objects in the vehicle's environment that may fully or partially occlude a tracked agent, concurrently tracked agents that intersect with each other in a given image frame, or some combination of both. To address some of these issues various agent tracking techniques may be implemented, some examples of which will be discussed in further detail below.

One example of a computing platform 300 and an example data flow pipeline that incorporates the disclosed techniques for optimizing captured sensor data to derive improved agent trajectories is described with reference to FIG. 3. In practice, this example pipeline may be implemented by any computing platform that is capable of obtaining and processing previously-captured sensor data. One possible example of such a computing platform and the structural components thereof is described below with reference to FIG. 9.

Figure 3:
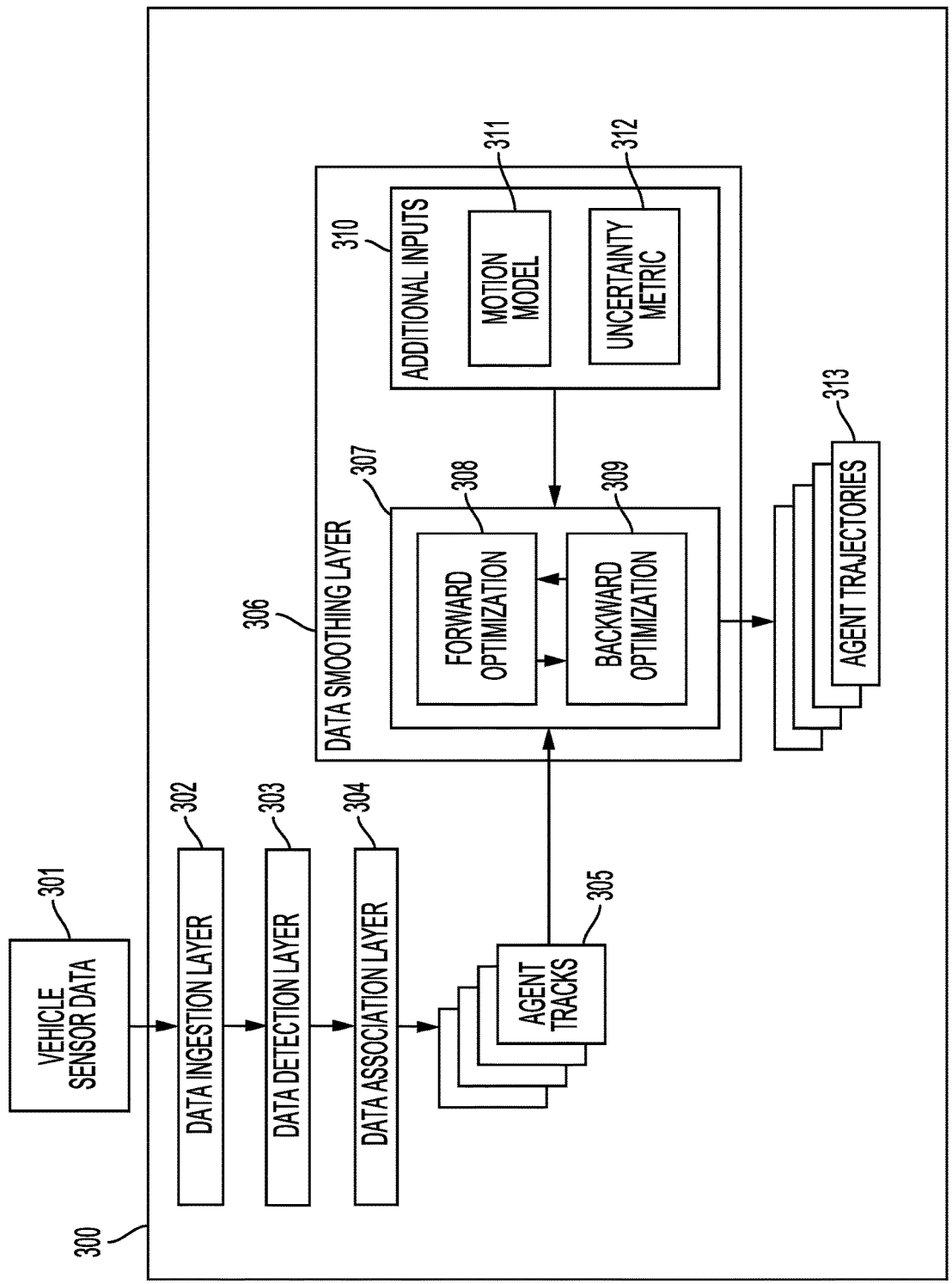
FIG. 3 is a simplified block diagram of a remote computing platform and an example data flow.

As shown in FIG. 3, captured vehicle sensor data 301 serves as the input from which the agent trajectories discussed herein are derived. For example, the vehicle sensor data 301 may include image data captured by a camera-based sensor system of a vehicle, such as the vehicle 101 shown in FIGS. 1A-2. As another example, the vehicle sensor data 301 may include telematics data captured by the camera-based sensor system, which may be used to localize the vehicle within a map for the area in which the vehicle was operating, such as an image-based map and/or a road-network map, among other possibilities.

In some cases, the computing platform 300 may receive sets of vehicle sensor data 301 from numerous different vehicles operating in different environments and at different times, and may serve as a repository for such information. In this regard, the data ingestion layer 302 of the computing platform 300 shown in FIG. 3 may take various forms, including one or more data ingestion tools that process and prepare the incoming data for use by other components of the computing platform 300.

The computing platform 300 may further include a data detection layer 303 that utilizes one or more object detection models to detect agents and other objects within the collected sensor data. The detection layer 303 may determine class labels, bounding boxes, or the like for each detected agent.

The computing platform 300 may further include a data association layer 304 that processes the ingested vehicle sensor data 301 in order to determine a track for each agent that is identified in the vehicle sensor data 301 by the data detection layer 303. In some cases, the computing platform 300 may localize each agent identified in the vehicle sensor data 301 within a 3D road-network map of the environment in which the vehicle was operating in order to perform agent tracking. This tracking operation may take various forms.

As one possibility, it may be assumed that the frame rate of the camera-based sensor system used to capture the image data is sufficiently high that agents identified within the sensor data do not move much between frames of the captured image data. Thus, the overlap of 3D features of an identified agent (e.g., a 3D bounding box) from frame to frame can provide an indication that it is the same agent between frames by using an Intersection over Union (IoU) or similar evaluation metric.

In addition, or alternatively, a kinematic motion model (e.g., a constant velocity model) may be utilized in connection with a Kalman filter or similar optimization algorithm to predict the future position of a given agent based on past observations, which may incorporate the speed of the agent. If an identified agent in the next image frame overlaps sufficiently with the predicted observation (e.g., using an IoU metric), it may be added to the track for the agent. In addition, a motion model may be utilized to advance an existing track through periods where the agent may be temporarily occluded.

As yet another possibility, each tracking match may be separately analyzed based on the visual appearance of the given agent across adjacent image frames. For instance, a visual matching algorithm may compare the pixels included within the bounding boxes for the agent between two image frames to determine if there is a sufficient match. In some implementations, this type of visual matching may be used as an alternative to an IoU metric to match a predicted position of an agent a detected agent position. In other implementations, visual matching may be used in addition to an IoU metric as an additional confirmation of one or more of the tracking operations discussed above.

Various other operations for determining respective tracks for each identified agent within the vehicle sensor data 301 are also possible.

Returning to FIG. 3, the output of the data association layer 304 is a respective time-sequence of observations of one or more positions of each agent identified within the vehicle sensor data 301, represented in FIG. 3 as set of one or more agent tracks 305. Each agent track 305 may then be processed in a data smoothing layer 306 of the computing platform 300, which may involve the optimization operations generally discussed above with respect to FIG. 2. For instance, the data smoothing layer 306 may include an optimization engine 307 that executes a first optimization operation that involves inputting an agent track 305 into a forward optimization 308, such as a forward Kalman filter. The output of the forward Kalman filter may include an updated time-sequence of observations for the agent having improved accuracy. The data smoothing layer 306 may then proceed with a second optimization operation that involves inputting the output of the forward Kalman filter into a backward optimization 309, such as a backward Kalman filter.

Both optimization operations within the data smoothing layer 306 may incorporate additional inputs 310, as noted above. For instance, the Kalman filters discussed herein may utilize a motion model 311 for predicting the kinematic motion of a given agent based on preceding observations of the agent, which may allow the prediction to incorporate the agent's speed. Various different motion models 311 are possible, and they may be defined in various ways. As one example, a motion model 311 may assume that the velocity of a given agent is constant between adjacent observations. As another example, a motion model 311 may allow for some acceleration of a given agent, up to a certain maximum acceleration between observations. Additionally or alternatively, specific motions models 311 may be defined for different types of agents to reflect the differences in their expected kinematic motion. Vehicles, cyclists, and pedestrians might all be associated with a different motion model 311, for instance. Numerous other motions models are possible as well.

Another additional input 310 that may be incorporated into the optimization operations of the data smoothing layer 306 is an uncertainty metric 312, which may be modeled in various ways. In some implementations, as discussed above, the uncertainty metric may be represented as a covariance relationship between the measurement error and the measured distance from the camera-based sensor system. For instance, the measurement error associated with a given observation may increase exponentially (e.g., quadratically) as the measurement distance increases. In some cases, the uncertainty metric 312 might be expressed instead as a confidence metric, although the relationship may be effectively the same—e.g., the confidence associated with a given observation may decrease exponentially as the measurement distance increases. The uncertainty metric 312 may incorporate other factors as well, such as the lateral distance of the observed agent from the optical axis of the camera-based sensor systems. Numerous other examples of uncertainty metrics that may be used are also possible.

It should be noted that, although the optimization engine 307 within the data smoothing layer 306 in FIG. 3 is discussed as undertaking the forward optimization 308 followed by the backward optimization 309, which is opposite of the order discussed above with respect to FIG. 2, the first and second optimization operations may be performed in either order to obtain the improved agent trajectories contemplated herein, as reflected in FIG. 3. While the optimization operation that begins from the higher confidence observations will tend to remove more of the error associated with each subsequent prediction, these corrections will occur whether the optimization is performed as the first or second step. Indeed, the data smoothing layer 306 may process agent tracks 305 for numerous different agents in various positions with respect to the vehicle that captured the sensor data. In some cases, where the agent and the vehicle are approaching each other, as shown in FIG. 2, the backward optimization 309 may remove more of the measurement error from the agent's track. Whereas the track for an agent that moves progressively further away from the vehicle may benefit more from the forward optimization 308.

Accordingly, the two optimization operations may be undertaken by the data processing layer 306 in the same order for each agent track 305. In other implementations, the data smoothing layer 306 may determine which portion (e.g., an earlier portion or a later portion) of a given agent track 305 is associated with higher confidence measurements, and then either adjust the order of the optimization operations or adjust the observations in the agent track (e.g., by reversing them) so that the more impactful optimization operation is performed first. In still other implementations, the data smoothing layer 306 may determine which optimization operation will remove the most measurement error and then perform only that optimization operation. Other examples are also possible.

Following the data smoothing layer 306, the computing platform 300 may utilize the output of the second optimization operation to derive an agent trajectory 313 for each agent track 305 that was optimized. In some examples, the agent trajectories 313 may be stored in a trajectory database or similar repository that is a part of the computing platform 300. In other examples, the derived trajectories may be transmitted to one or more additional computing platforms where they may be stored and/or used for various purposes.

As discussed above, the agent trajectories 313 derived in this way may benefit from increased accuracy as a result of the combined forward and backward optimization of the captured sensor data in each agent track 305. This increased accuracy may allow the agent trajectories to be incorporated into various downstream tasks as appropriate. As one possibility, the improved agent trajectories may be used to train machine learning models to be used by an on-board computing system, as noted above. As another possibility, the improved agent trajectories can be encoded as pre-processed information about the world (e.g., encoded as map data) that can be used by an on-board computing system of a vehicle during perception, prediction, and planning operations. Further, map data relating to prior agent trajectories can be also used by a transportation-matching platform that is configured to match individuals interested in obtaining transportation (i.e., "transportation requestors") with vehicles capable of providing such transportation. Such information may improve the transportation-matching platform's ability to perform various operations—including but not limited to matching requestors with available vehicles within the area, generating the most optimal routes for vehicles to follow when picking up and/or transporting requestors within the area, determining pickup and drop-off locations, providing accurate estimates of pickup and drop-off times within the area, and/or effectively pre-positioning vehicles within the area in anticipation of responding to transportation-matching requests.

Various other uses for the improved agent trajectories discussed above are also possible.

An example of utilizing the techniques discussed above for determining multiple agent tracks across a series of captured image frames is illustrated in FIGS. 4A-4E. As noted above, determining one or more agent tracks may be performed by the computing platform 300 in the data association layer 304. Beginning with FIG. 4A, a first frame 400a of captured image data from the perspective of a vehicle 401 is shown. The vehicle 401 may be similar to the vehicle 101 shown in FIGS. 1A-2, for instance, and may include a camera-based sensor system.

Figure 4A:
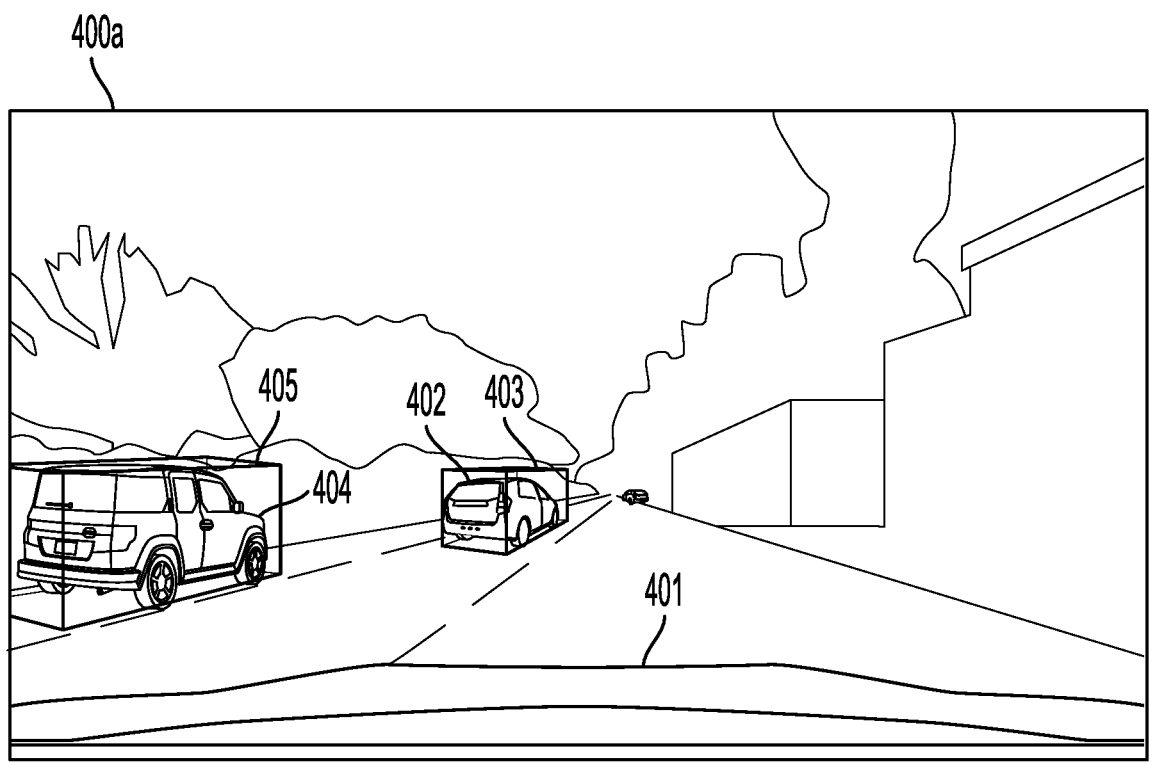
FIG. 4A is a diagram that illustrates a first frame of captured image data including identified agents in respective bounding boxes.

As shown in FIG. 4A, the vehicle 401 is driving on a multi-lane roadway and the first frame 400a of captures image data includes an indication of two agents in the vicinity of the vehicle 401. A first agent, vehicle 402, is identified and associated with a first agent ID represented by the bounding box 403. A second agent, vehicle 404 is also identified and associated with a second agent ID represented by the bounding box 405.

Figure 4B:
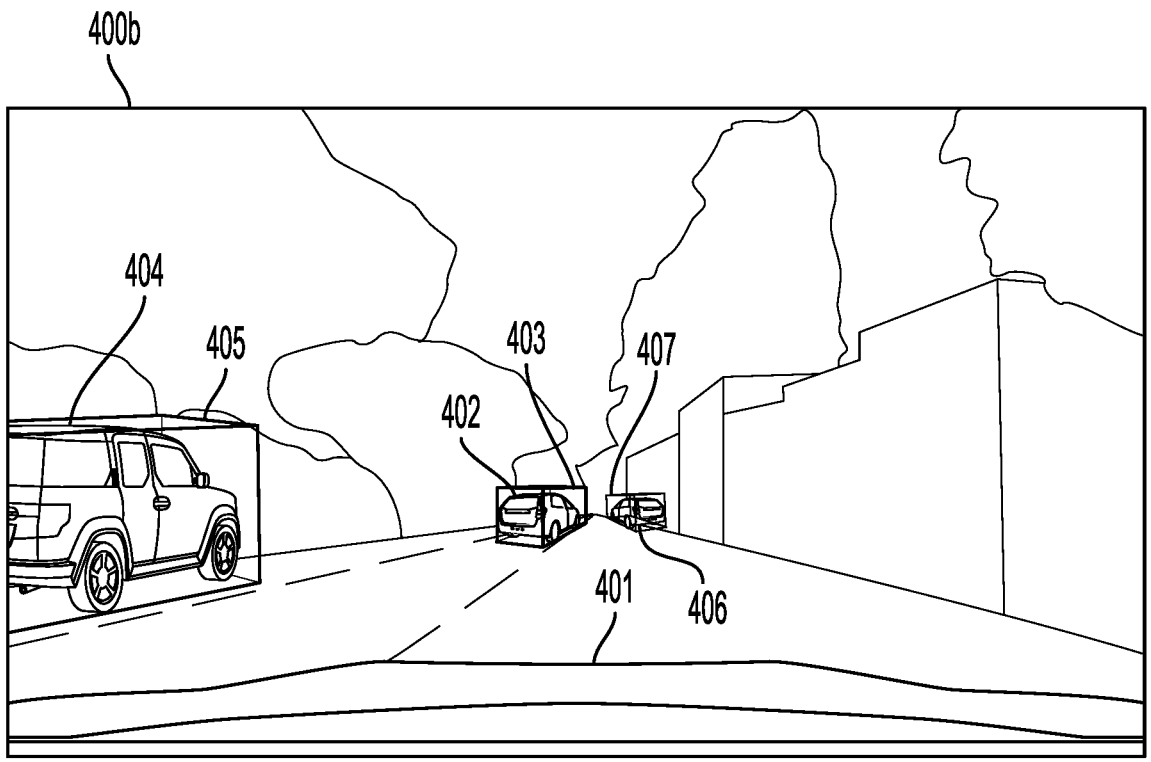
FIG. 4B is a diagram that illustrates a second frame of captured image data including identified agents in respective bounding boxes.

The computing platform will then employ one or more of the tracking operations discussed above across the series of image frames shown in FIGS. 4A-4E. For example, turning to a subsequent image frame 400b shown in FIG. 4B, the computing platform 300 may determine that there is sufficient overlap, based on an IoU metric, between the observation of agent 402 in image frames 400a and 400b such that a match is determined. Thus, the observation of agent 402 in frame 400b is assigned the same agent ID and is added to the track for the agent 402. FIG. 4B also shows an additional vehicle 406 that is observed by the vehicle 401. Because the observation of vehicle 406 does not overlap with any prior observations in the image frame 400a, a new agent ID may be assigned, represented by the bounding box 407, and a new track may be initiated for the agent 406.

As another example, the computing platform 300 may utilize the observed agent positions shown in the first image frame 400a (and perhaps previous frames preceding the first frame 400a) and a motion model to predict a future position for each of the agents 402 and 404. These predicted future position for each agent may then be compared with the observations shown in FIG. 4B to determine the degree of overlap. Beneficially, this type of motion model-based prediction may account for some situations that may otherwise result in tracking failures if the overlap between consecutive image frames is relied upon in isolation. For instance, an agent is moving relatively quickly in relation to the vehicle 401 and the frame rate of the camera-based sensor system is not sufficiently high, the agent may move far enough between captured image frames that there is little or no overlap in the consecutive observations. However, a motion model-based prediction may incorporate the speed of the agent using two or more previous observations. This may yield a more accurate estimate of where the agent is likely to be positioned in the next frame, which in turn may exhibit the expected overlap with the next observed position of the agent.

As yet another example, the computing platform 300 may utilize one or more visual matching algorithms as a part of, or in addition to, determining matches using the operations discussed above. For instance, starting from the observed position of the agent 402 in frame 400a, an estimated position of the agent 402 may be determined and then compared to the observations in frame 400b. The comparison may consider not only the degree of overlap between the bounding boxes 403 in the two image frames, but also the degree of similarity between the pixels in the two images. As a result, the computing platform 300 may determine that there is both substantial overlap between the two frames, and that the agent 402 observed in frame 400b appears visually similar to the agent 402 observed in frame 400a. In this way, the track for agent 402 may be determined with a relatively high degree of accuracy.

Figure 4C:
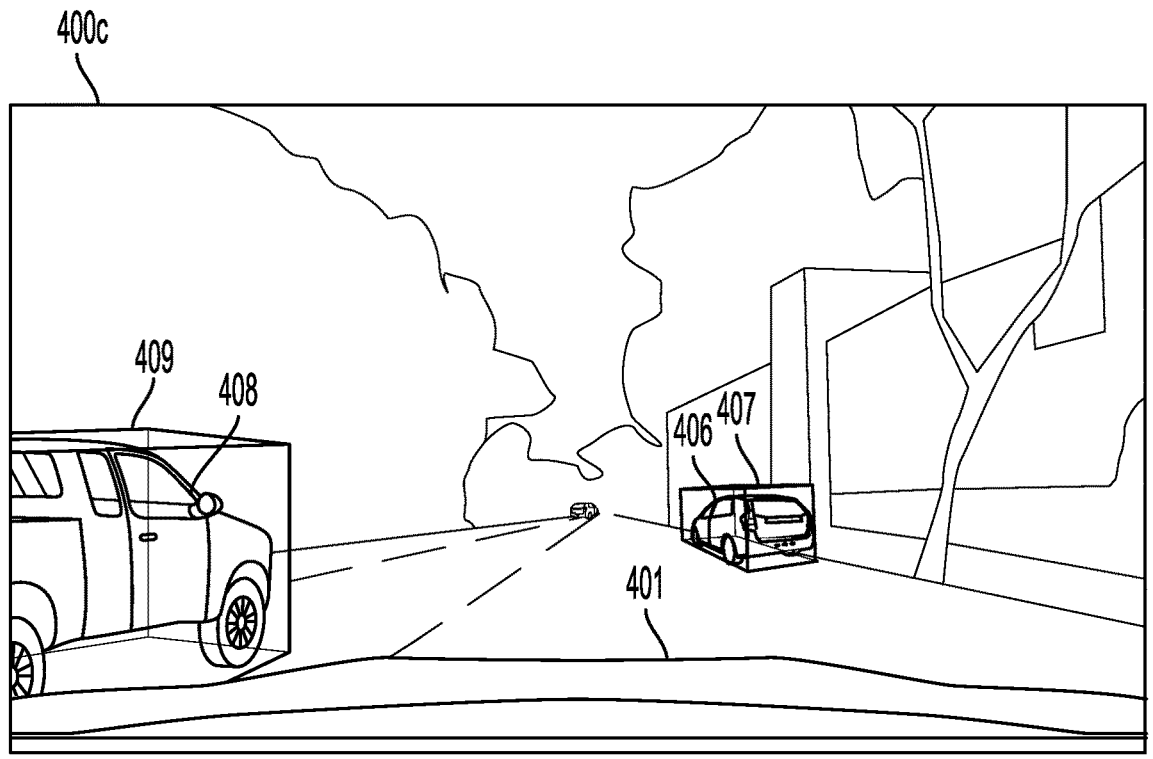
FIG. 4C is a diagram that illustrates a third frame of captured image data including identified agents in respective bounding boxes.

Beneficially, the tracking operations discussed above may account for many challenging tracking scenarios that may be presented within the captured sensor data. Once such scenario is depicted in FIG. 4C, which illustrates a subsequent image frame 400c captured by the camera-based sensor system of vehicle 401. As an initial matter, image frame 400c shows an observation of agent 406 that is now closer to the vehicle 401 and has been assigned a consistent agent ID represented by bounding box 407. Additionally, although still technically visible within the image frame 400c, the agent 402 has moved beyond the effective range of the camera-based sensor system and is therefore no longer identified as an agent, effectively ending the track of agent 402. Based on the observed speed of the agent 402, which may be derivable from the preceding observations, this position of the agent 402, and the corresponding end of the track, may have been predicted by the computing platform 300.

However, a new agent 408 is also observed in image frame 400c and presents an intersection between the observations of two agents that can be difficult for some tracking operations to accurately resolve. As can be seen by comparing FIG. 4B and FIG. 4C, the new agent 408 has entirely obscured agent 404. As a result, there is a substantial degree of overlap between the two observations, and thus a simple, intersection-only based matching technique may inaccurately identify the agent 408 as the agent 404, and incorrectly assign it the agent ID and represented by bounding box 405. In addition, a matching analysis using some motion models (e.g., a constant velocity model) may determine that the observed position of the agent 408 does not sufficiently match the predicted position of agent 404, which is assumed to proceed without any acceleration (i.e., lateral acceleration to change lanes). On the other hand, other less-constrained motion models that allow for more detailed vehicle movements, such as a maximum acceleration model, may not be violated by the observation of agent 408. For example, predictions using a maximum acceleration motion model may include a range of estimated positions, which may include the observed position of agent 408.

In these situations, it may only be possible to accurately resolve the tracking for agents 404 and 408 by incorporating the visual matching techniques discussed above. For instance, even though the observed positions of agent 404 and agent 408 may overlap between frames 400b and 400c, and despite the motion model-based prediction indicating that the observation of agent 408 may intersect the range of predicted positions of agent 404, the visual matching algorithm may determine that the two observations, representing two differently shaped vehicles, do not possess sufficient similarly for a match. As a result, the computing platform 300 may correctly determine that agent 408 is indeed a newly observed agent and may assign a new agent ID represented by bounding box 409. This also begins a new track for agent 409.

Figure 4D:
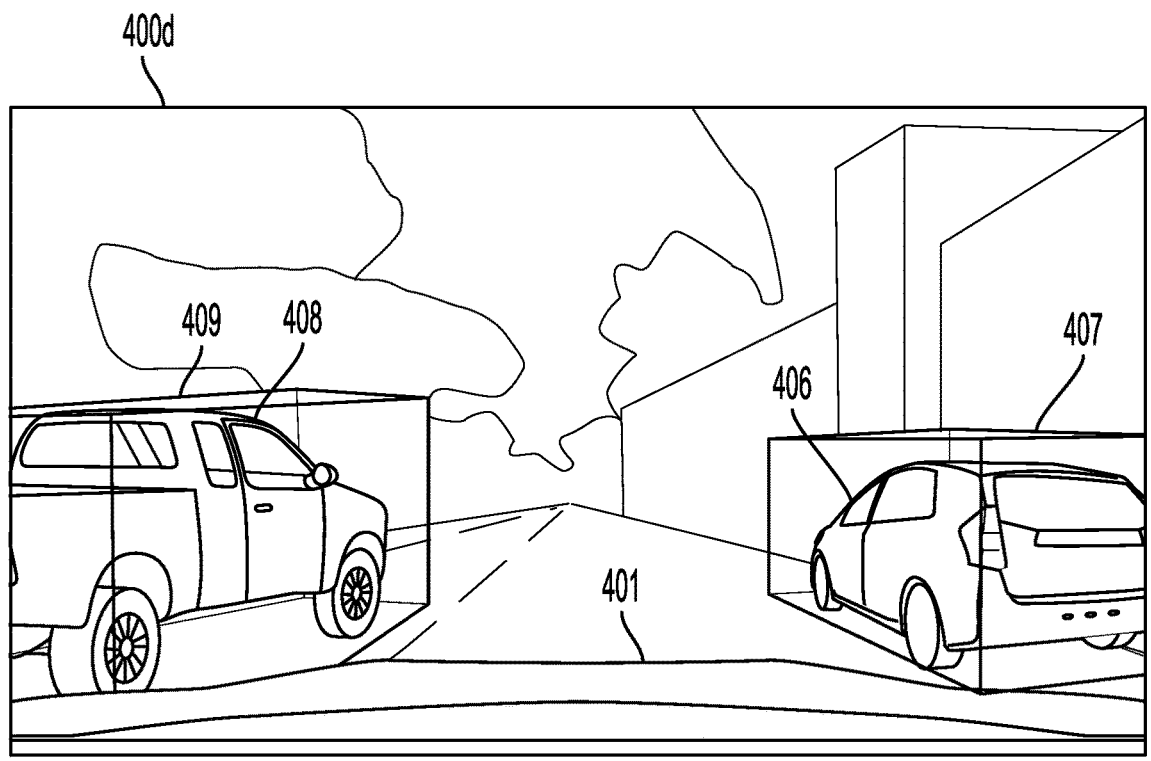
FIG. 4D is a diagram that illustrates a fourth frame of captured image data including identified agents in respective bounding boxes.

Turning to FIG. 4D, a subsequent image frame 400d captured by the camera-based sensor system of vehicle 401 is shown. In the frame 400d, the agent 406 is observed still closer to the vehicle 401 and maintains a consistent agent ID represented by the bounding box 407. Additionally, agent 408 is shown maintaining a consistent agent ID represented by the bounding box 409. Agent 404, however, is still completely occluded by agent 408. Nonetheless, the computing platform 300 may continue to predict an estimated position for the agent 404 based on the last available observation(s) of agent 404, using a motion model as discussed above.

Figure 4E:
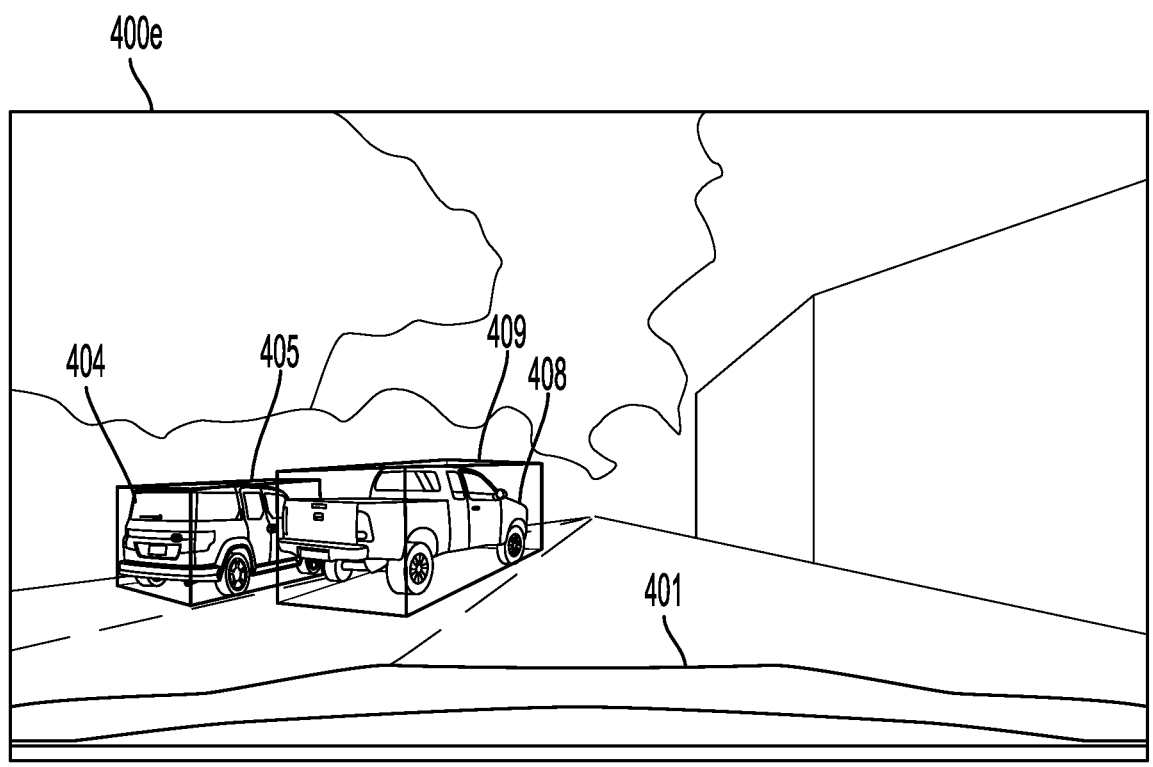
FIG. 4E is a diagram that illustrates a fifth frame of captured image data including identified agents in respective bounding boxes.

As a result, when the agent 408 eventually moves further ahead and the agent 404 becomes visible again, as shown in the subsequent image frame 400e shown in FIG. 4E, the observed position of agent 404 may be compared with the predicted position of agent 404 that the computing platform 300 has carried forward through the occlusion. Even though agent 404 is still partially occluded in the image frame 400e, based on a sufficient intersection between the predicted and the observed positions of agent 404 and a sufficient degree of visual similarity, as determined by the visual matching algorithm, the computing platform 300 may reassign the previously determined agent ID represented by the bounding box 405, thereby continuing the track of agent 404.

It will be appreciated that, within the image data captured by the camera-based sensor system of vehicle 401 in the example above, there are missing observations of agent 404 for at least the time spanning FIGS. 4C-4D, when agent 404 was occluded by agent 408. Nonetheless, as discussed previously, the techniques discussed herein may be used for deriving an accurate trajectory for agent 404 despite this gap in observations.

In this regard, it will be further appreciated that less robust tracking techniques might not be capable of accurately determining that the observation of agent 404 in image frame 400e corresponds to the same agent 404 see in image frame 400b. In such cases, a computing platform utilizing such less robust tracking techniques may assign a new agent ID to the observation of agent 404 shown in frame 400e, effectively beginning a new track that is not associated with the previous track for agent 404, which effectively ends at image frame 404b. For this reason, it may not be possible to determine a complete trajectory for agent 404, even if it is possible to reduce the measurement error in the captured sensor data using the smoothing operations discussed above.

Figure 5:
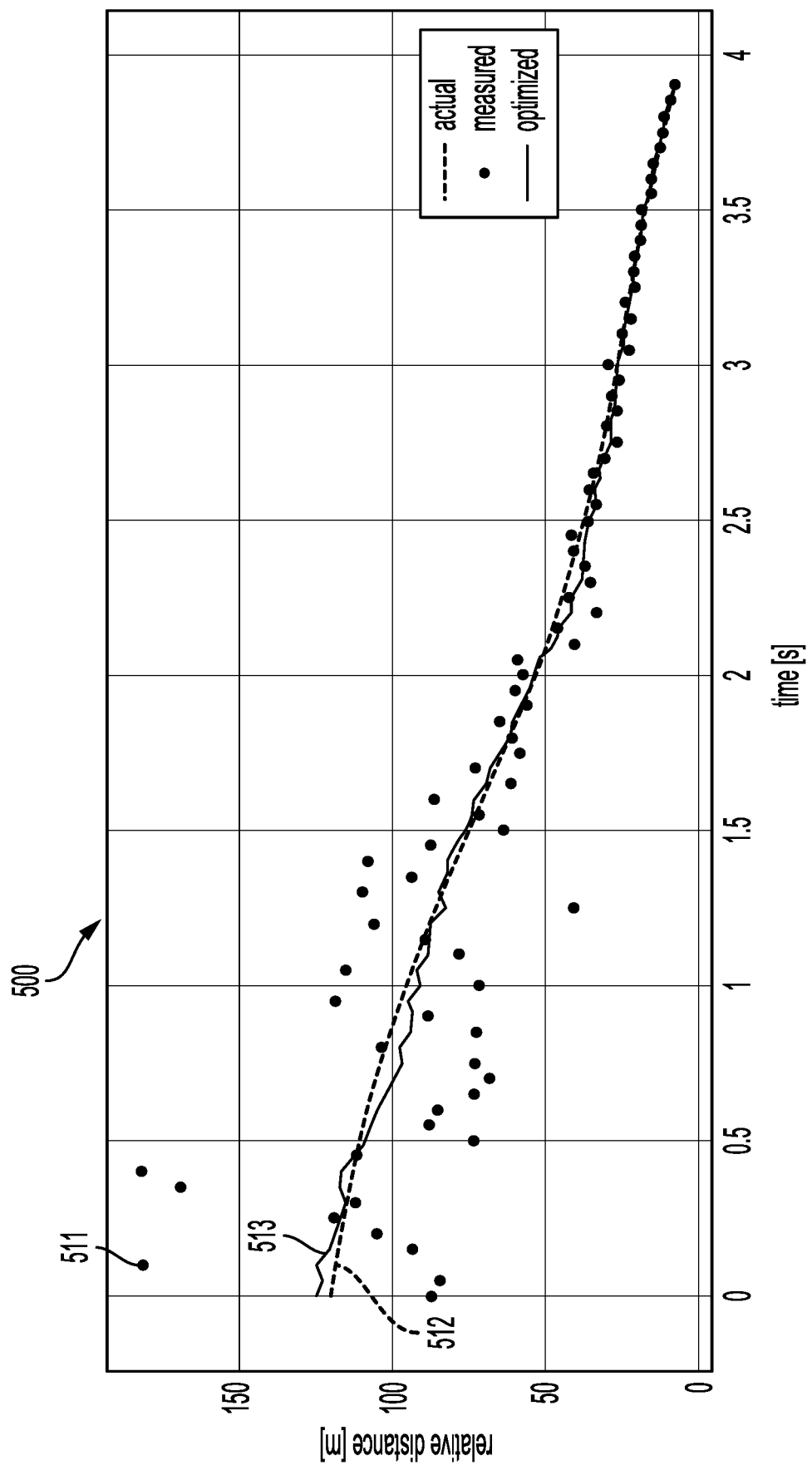
FIG. 5 is a diagram that illustrates an example graph showing a line representing the actual distance to an agent, the measured distances to the agent over time, and an optimized line representing the estimated distance to the agent.

Turning to FIG. 5, an example graph 500 depicts the beneficial effect that the optimization operations discussed above may have in reducing the measurement error associated with a set of observations of a given agent. As shown in FIG. 5, the graph represents the relative distance of the agent from a camera-based sensor system of a vehicle over time and includes an assembled time-sequence of measured observations 511 of the agent, shown as dots. In this regard, the time-sequence of observations 511 of the agent may be the output of a tracking operation, such as one or more of the tracking operations discussed above and shown in FIGS. 4A-4E, that has already been performed on the captured sensor data.

For reference only, the graph 500 also includes a dashed line 512 representing the actual distance of the agent in relation to the vehicle over time. In practice, this information will not be available to either the sensor-equipped vehicle during operation or the computing platform performing the tracking or optimization operations. Nonetheless, the dashed line 512 representing the actual distance may provide a useful benchmark by which to evaluate the effectiveness of the optimization.

As reflected in FIG. 5 and noted above, the error associated with the measured time-sequence of observations 511 increases as the distance from the vehicle increases. Further, the graph 500 represents an agent that is moving toward the vehicle as time progresses, from a distance of about 125 meters at zero seconds to a distance less than 10 meters at approximately four seconds. Thus, the graph 500 presents a scenario similar to the one shown in FIGS. 1A-2, in which the earliest observations of the agent are associated with the highest degree of error and the latest observations are associated with the lowest degree of error.

Accordingly, an offline computing platform, such as the computing platform 300 shown in FIG. 3, may perform the two-step optimization on the time-sequence of observations 511. For instance, the computing platform 300 may perform a first optimization operation on the time-sequence of observations 511 that begins at the earliest observation (e.g., at zero seconds) and proceeds chronologically forward. As noted above, the first optimization operation may involve a Kalman filter that utilizes as inputs a motion model for the agent, an uncertainty metric reflecting the covariance relationship between the measurement error and distance from the vehicle, and the time-sequence of observations 511 in order to predict the estimated position of each next observation in the sequence. Each prediction is compared to the position of the next measured observation and then updated based on a weighted (e.g., based on the associated measurement error) fusing of the estimated and measured positions. The updated prediction is then used as the basis for the next prediction, and so on, until a first updated time-sequence of observations for the agent is obtained.

As noted previously, for the type of scenario shown in FIG. 5, the forward Kalman filtering process may reduce some of the measurement error associated with the time-sequence of observations 511. However, the more significant error reduction will be realized by the backward Kalman filtering, which begins from the higher confidence observations. Accordingly, the computing platform 300 may perform the second optimization operation, using the first updated time-sequence of observations as input, and beginning at the latest observation (e.g., at approximately four seconds) and proceeding chronologically backward. Thus, the backward pass may utilize updated observations that have already incorporated some degree of error correction. Nonetheless, on the backward pass, the preceding observations having a higher confidence and the predictions derived therefrom may tend to have an even greater corrective effect on the measurement errors associated with subsequent observations.

The output of the backward Kalman filter may be a second updated time-sequence of observations that may be significantly smoothed with respect to the initial time-sequence of observations 511. Indeed, FIG. 5 illustrates an optimized line 513 that is based on the second updated time-sequence of observations that tracks relatively closely with the dashed line 512 representing the actual distance of the agent from the vehicle.

Accordingly, two-step optimization may allow the computing platform 300 to derive a relatively accurate trajectory for the agent that encompasses the entire time-sequence of positions in which the agent was identified within the captured sensor data, which may then be put to one or more of the uses noted above.

In addition to reducing measurement error, the optimization discussed herein may allow derived agent trajectories to be enhanced in other ways as well. For example, in some implementations, the initial time-sequence of observations for a given agent may include gaps or other discontinuities due to missing observations. Such missing observations may be a result of occlusions or other issues during the tracking operation, among other possibilities. Nonetheless, such gaps may not have a substantial effect on the final output of the optimization operations noted above. As a result, the final output of the optimization operations, such as at the optimized line 513 shown in FIG. 5, may be used as a basis to augment the observations by filling in missing detections with one or more simulated observations that are consistent with the surrounding, optimized observations. This may allow for the trajectories that are ultimately derived from the optimized sensor data to include more granular information.

In a similar way, it may be possible to increase the effective frame rate of the optimized sensor data beyond the frame rate at which the original sensor data was actually captured. For example, an example stereo camera as discussed herein may have a nominal frame rate of 5 frames per second ("fps"). Whereas the LiDAR-based sensor systems utilized by autonomous and semi-autonomous vehicles generally capture sensor data a rate of 30 fps or more. For this reason, it may be desirable to increase the effective frame rate of the optimized sensor data obtained from the stereo camera, if the ultimate goal is to derive trajectories that will be utilized by vehicles that normally capture and utilize higher-frame rate sensor data.

Thus, the computing platform 300 may augment the second updated time-sequence of observations by interpolating between each adjacent pair of observation to add one or more additional intermediate observations, consistent with the surrounding observations. For example, for each observation in the second updated time-sequence of observations, the computing platform may interpolate (e.g., using a motion model) to add five additional observations before the next observation. In this way, the effective frame rate of the optimized observations, and the trajectories derived therefrom, may be increased from 5 fps to 30 fps. Other examples for adjusting the frame rate of the optimized sensor data are also possible.

Various other examples of utilizing the techniques discussed herein to optimize captured sensor data for improving agent trajectories are also possible.

Figure 6:
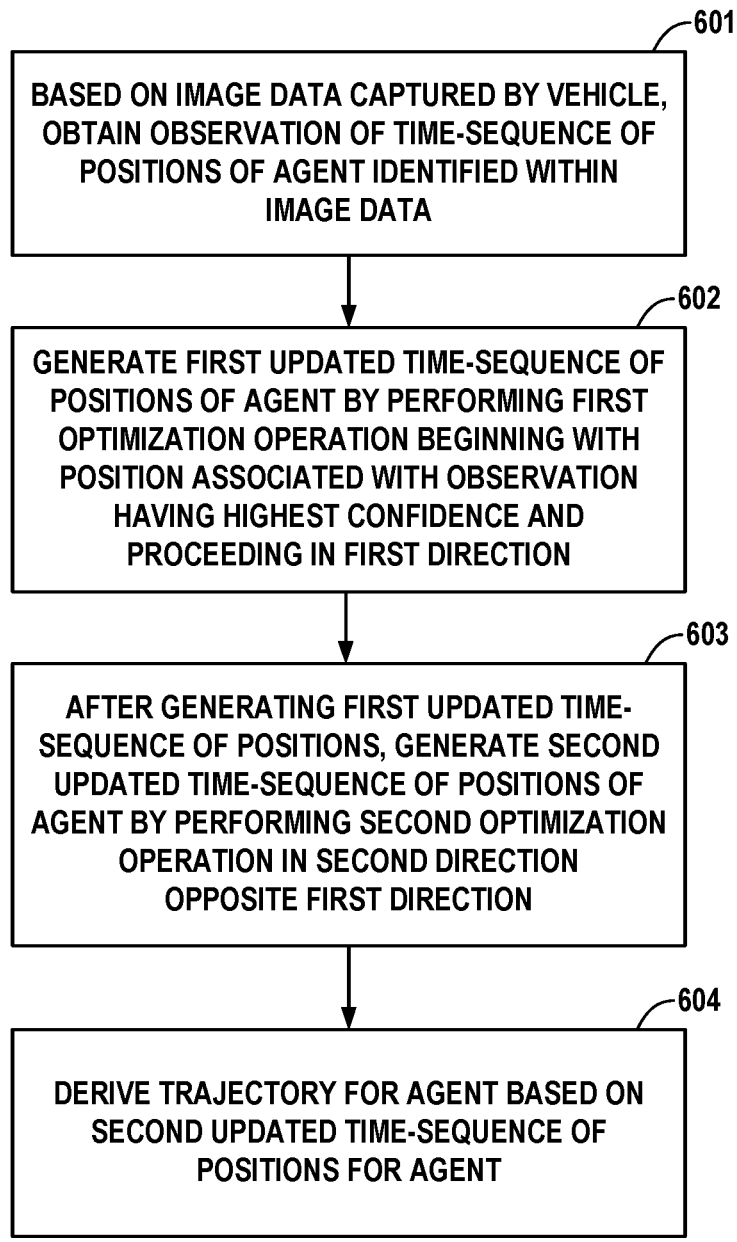
FIG. 6 is a functional block diagram that illustrates one example set of functions for deriving an agent trajectory.

Turning now to FIG. 6, a functional block diagram is shown that illustrates one example set of functions for deriving an agent trajectory, according to implementations discussed herein.

At block 601, a computing platform may, based on image data captured by a vehicle in an environment, obtain observations of a time-sequence of positions of an agent identified within the image data. The computing platform may be, for example, the computing platform 300 shown in FIG. 3 and discussed above.

At block 602, the computing platform may generate a first updated time-sequence of positions of the agent by performing a first optimization operation on the observed time-sequence of positions. The first optimization operation may include processing at least two or more positions of the observed time-sequence of positions by beginning with a position associated with an observation having the highest confidence in the time-sequence of observations and proceeding in a first direction. In some cases, the computing platform may determine the position of the agent that is associated with the highest confidence based on the distance of each observed position from the vehicle.

At block 603, after generating the first updated time-sequence of positions, the computing platform may generate a second updated time-sequence of positions of the agent by performing a second optimization operation on the first updated time-sequence of positions. The second optimization operation may include processing at least two or more positions of the first updated time-sequence of positions in a second direction opposite the first direction. For example, if the first optimization operation processes the time sequence of positions chronologically backward, as captured by the vehicle, then the second optimization operation would process the first updated time-sequence of positions chronologically forward.

At block 604, the computing platform may derive a trajectory for the agent in the environment based on the second updated time-sequence of positions for the agent. As discussed above, the first and second optimization operations may serve to improve the accuracy of the captured sensor data, and the resulting trajectory derived for the agent, by leveraging the highest confidence observations of the agent regardless of whether they occur at the beginning or end of the time-sequence of positions observed by the vehicle.

As noted, the prior agent trajectories discussed above may be used to improve the safe and efficient operation of a sensor-equipped vehicle. One possible example of such a vehicle will now be discussed in greater detail.

Figure 7:
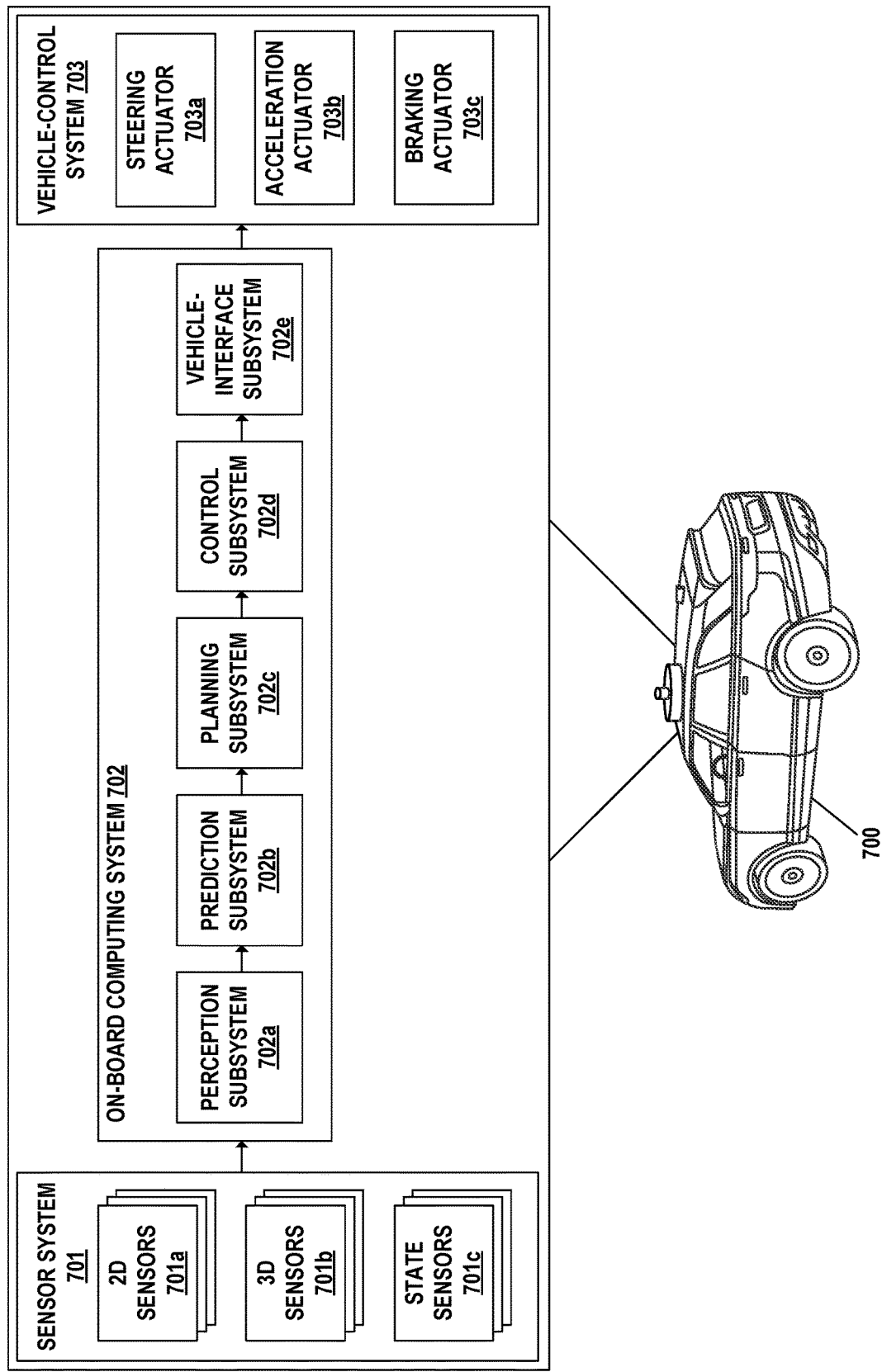
FIG. 7 is a simplified block diagram that illustrates certain systems that may be included in an example vehicle.

Turning to FIG. 7, a simplified block diagram is provided to illustrate certain systems that may be included in an example vehicle 700. As shown, at a high level, vehicle 700 may include at least (i) a sensor system 701 that is configured to capture sensor data that is representative of the real-world environment being perceived by the vehicle (i.e., the collection vehicle's "surrounding environment") and/or the collection vehicle's operation within that real-world environment, (ii) an on-board computing system 702 that is configured to perform functions related to autonomous operation of vehicle 700 (and perhaps other functions as well), and (iii) a vehicle-control system 703 that is configured to control the physical operation of vehicle 700, among other possibilities. Each of these systems may take various forms.

In general, sensor system 701 may comprise any of various different types of sensors, each of which is generally configured to detect one or more particular stimuli based on vehicle 700 operating in a real-world environment. The sensors then output sensor data that is indicative of one or more measured values of the one or more stimuli at one or more capture times (which may each comprise a single instant of time or a range of times).

For instance, as one possibility, sensor system 701 may include one or more 2D sensors 701*a* that are each configured to capture 2D sensor data that is representative of the vehicle's surrounding environment. Examples of 2D sensor(s) 701*a* may include a single 2D camera, a 2D camera array, a 2D RADAR unit, a 2D SONAR unit, a 2D ultrasound unit, a 2D scanner, and/or 2D sensors equipped with visible-light and/or infrared sensing capabilities, among other possibilities. Further, in an example implementation, 2D sensor(s) 701*a* may have an arrangement that is capable of capturing 2D sensor data representing a 360° view of the vehicle's surrounding environment, one example of which may take the form of an array of 6-7 cameras that each have a different capture angle. Other 2D sensor arrangements are also possible.

As another possibility, sensor system 701 may include one or more 3D sensors 701*b* that are each configured to capture 3D sensor data that is representative of the vehicle's surrounding environment. Examples of 3D sensor(s) 701*b* may include a LiDAR unit, a 3D RADAR unit, a 3D SONAR unit, a 3D ultrasound unit, and a camera array equipped for stereo vision, among other possibilities. Further, in an example implementation, 3D sensor(s) 701*b* may comprise an arrangement that is capable of capturing 3D sensor data representing a 360° view of the vehicle's surrounding environment, one example of which may take the form of a LiDAR unit that is configured to rotate 360° around its installation axis. Other 3D sensor arrangements are also possible.

As yet another possibility, sensor system 701 may include one or more state sensors 701*c* that are each configured capture sensor data that is indicative of aspects of the vehicle's current state, such as the vehicle's current position, current orientation (e.g., heading/yaw, pitch, and/or roll), current velocity, and/or current acceleration of vehicle 700. Examples of state sensor(s) 701*c* may include an IMU (which may be comprised of accelerometers, gyroscopes, and/or magnetometers), an Inertial Navigation System (INS), a Global Navigation Satellite System (GNSS) unit such as a GPS unit, among other possibilities.

Sensor system 701 may include various other types of sensors as well.

In turn, on-board computing system 702 may generally comprise any computing system that includes at least a communication interface, a processor, and data storage, where such components may either be part of a single physical computing device or be distributed across a plurality of physical computing devices that are interconnected together via a communication link. Each of these components may take various forms.

For instance, the communication interface of on-board computing system 702 may take the form of any one or more interfaces that facilitate communication with other systems of vehicle 700 (e.g., sensor system 701, vehicle-control system 703, etc.) and/or remote computing systems (e.g., a transportation-matching system), among other possibilities.

In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols.

Further, the processor of on-board computing system 702 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

Further yet, the data storage of on-board computing system 702 may comprise one or more non-transitory computer-readable mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the processor of on-board computing system 702 such that on-board computing system 702 is configured to perform various functions related to the autonomous operation of vehicle 700 (among other possible functions), and (ii) data that may be obtained, derived, or otherwise stored by on-board computing system 702.

In one embodiment, on-board computing system 702 may also be functionally configured into a number of different subsystems that are each tasked with performing a specific subset of functions that facilitate the autonomous operation of vehicle 700, and these subsystems may be collectively referred to as the vehicle's "autonomy system." In practice, each of these subsystems may be implemented in the form of program instructions that are stored in the on-board computing system's data storage and are executable by the on-board computing system's processor to carry out the subsystem's specific subset of functions, although other implementations are possible as well—including the possibility that different subsystems could be implemented via different hardware components of on-board computing system 702.

As shown in FIG. 7, in one embodiment, the functional subsystems of on-board computing system 702 may include (i) a perception subsystem 702a that generally functions to derive a representation of the surrounding environment being perceived by vehicle 700, (ii) a prediction subsystem 702b that generally functions to predict the future state of each object detected in the vehicle's surrounding environment, (iii) a planning subsystem 702c that generally functions to derive a behavior plan for vehicle 700, (iv) a control subsystem 702d that generally functions to transform the behavior plan for vehicle 700 into control signals for causing vehicle 700 to execute the behavior plan, and (v) a vehicle-interface subsystem 702e that generally functions to translate the control signals into a format that vehicle-control system 703 can interpret and execute. However, it should be understood that the functional subsystems of on-board computing system 702 may take various other forms as well. Each of these example subsystems will now be described in further detail below.

For instance, the subsystems of on-board computing system 702 may begin with perception subsystem 702a, which may be configured to fuse together various different types of "raw" data that relate to the vehicle's perception of its surrounding environment and thereby derive a representation of the surrounding environment being perceived by vehicle 700. In this respect, the "raw" data that is used by perception subsystem 702a to derive the representation of the vehicle's surrounding environment may take any of various forms.

For instance, at a minimum, the "raw" data that is used by perception subsystem 702a may include multiple different types of sensor data captured by sensor system 701, such as 2D sensor data (e.g., image data) that provides a 2D representation of the vehicle's surrounding environment, 3D sensor data (e.g., LiDAR data) that provides a 3D representation of the vehicle's surrounding environment, and/or state data for vehicle 700 that indicates the past and current position, orientation, velocity, and acceleration of vehicle 700. Additionally, the "raw" data that is used by perception subsystem 702a may include map data associated with the vehicle's location, such as high-definition geometric and/or semantic map data, which may be preloaded onto on-board computing system 702 and/or obtained from a remote computing system. Additionally yet, the "raw" data that is used by perception subsystem 702a may include navigation data for vehicle 700 that indicates a specified origin and/or specified destination for vehicle 700, which may be obtained from a remote computing system (e.g., a transportation-matching system) and/or input by a human riding in vehicle 700 via a user-interface component that is communicatively coupled to on-board computing system 702. Additionally still, the "raw" data that is used by perception subsystem 702a may include other types of data that may provide context for the vehicle's perception of its surrounding environment, such as weather data and/or traffic data, which may be obtained from a remote computing system. The "raw" data that is used by perception subsystem 702a may include other types of data as well.

Advantageously, by fusing together multiple different types of raw data (e.g., both 2D sensor data and 3D sensor data), perception subsystem 702a is able to leverage the relative strengths of these different types of raw data in a way that may produce a more accurate and precise representation of the surrounding environment being perceived by vehicle 700.

Further, the function of deriving the representation of the surrounding environment perceived by vehicle 700 using the raw data may include various aspects. For instance, one aspect of deriving the representation of the surrounding environment perceived by vehicle 700 using the raw data may involve determining a current state of vehicle 700 itself, such as a current position, a current orientation, a current velocity, and/or a current acceleration, among other possibilities. In this respect, perception subsystem 702a may also employ a localization technique such as SLAM to assist in the determination of the vehicle's current position and/or orientation. (Alternatively, it is possible that on-board computing system 702 may run a separate localization service that determines position and/or orientation values for vehicle 700 based on raw data, in which case these position and/or orientation values may serve as another input to perception subsystem 702a).

Another aspect of deriving the representation of the surrounding environment perceived by vehicle 700 using the raw data may involve detecting objects within the vehicle's surrounding environment, which may result in the determination of class labels, bounding boxes, or the like for each detected object. In this respect, the particular classes of objects that are detected by perception subsystem 702a (which may be referred to as "agents") may take various forms, including both (i) "dynamic" objects that have the potential to move, such as vehicles, cyclists, pedestrians, and animals, among other examples, and (ii) "static" objects that generally do not have the potential to move, such as streets, curbs, lane markings, traffic lights, stop signs, and buildings, among other examples. Further, in practice, perception subsystem 702a may be configured to detect objects within the vehicle's surrounding environment using any type of object detection model now known or later developed, including but not limited object detection models based on convolutional neural networks (CNN).

Yet another aspect of deriving the representation of the surrounding environment perceived by vehicle 700 using the raw data may involve determining a current state of each object detected in the vehicle's surrounding environment, such as a current position (which could be reflected in terms of coordinates and/or in terms of a distance and direction from vehicle 700), a current orientation, a current velocity, and/or a current acceleration of each detected object, among other possibilities. In this respect, the current state of each detected object may be determined either in terms of an absolute measurement system or in terms of a relative measurement system that is defined relative to a state of vehicle 700, among other possibilities.

The function of deriving the representation of the surrounding environment perceived by vehicle 700 using the raw data may include other aspects as well.

Further yet, the derived representation of the surrounding environment perceived by vehicle 700 may incorporate various different information about the surrounding environment perceived by vehicle 700, examples of which may include (i) a respective set of information for each object detected in the vehicle's surrounding, such as a class label, a bounding box, and/or state information for each detected object, (ii) a set of information for vehicle 700 itself, such as state information and/or navigation information (e.g., a specified destination), and/or (iii) other semantic information about the surrounding environment (e.g., time of day, weather conditions, traffic conditions, etc.). The derived representation of the surrounding environment perceived by vehicle 700 may incorporate other types of information about the surrounding environment perceived by vehicle 700 as well.

Still further, the derived representation of the surrounding environment perceived by vehicle 700 may be embodied in various forms. For instance, as one possibility, the derived representation of the surrounding environment perceived by vehicle 700 may be embodied in the form of a data structure that represents the surrounding environment perceived by vehicle 700, which may comprise respective data arrays (e.g., vectors) that contain information about the objects detected in the surrounding environment perceived by vehicle 700, a data array that contains information about vehicle 700, and/or one or more data arrays that contain other semantic information about the surrounding environment. Such a data structure may be referred to as a "parameter-based encoding."

As another possibility, the derived representation of the surrounding environment perceived by vehicle 700 may be embodied in the form of a rasterized image that represents the surrounding environment perceived by vehicle 700 in the form of colored pixels. In this respect, the rasterized image may represent the surrounding environment perceived by vehicle 700 from various different visual perspectives, examples of which may include a "top down" view and a "bird's eye" view of the surrounding environment, among other possibilities. Further, in the rasterized image, the objects detected in the surrounding environment of vehicle 700 (and perhaps vehicle 700 itself) could be shown as color-coded bitmasks and/or bounding boxes, among other possibilities.

The derived representation of the surrounding environment perceived by vehicle 700 may be embodied in other forms as well.

As shown, perception subsystem 702a may pass its derived representation of the vehicle's surrounding environment to prediction subsystem 702b. In turn, prediction subsystem 702b may be configured to use the derived representation of the vehicle's surrounding environment (and perhaps other data) to predict a future state of each object detected in the vehicle's surrounding environment at one or more future times (e.g., at each second over the next 5 seconds)—which may enable vehicle 700 to anticipate how the real-world objects in its surrounding environment are likely to behave in the future and then plan its behavior in a way that accounts for this future behavior.

Prediction subsystem 702b may be configured to predict various aspects of a detected object's future state, examples of which may include a predicted future position of the detected object, a predicted future orientation of the detected object, a predicted future velocity of the detected object, and/or predicted future acceleration of the detected object, among other possibilities. In this respect, if prediction subsystem 702b is configured to predict this type of future state information for a detected object at multiple future times, such a time sequence of future states may collectively define a predicted future trajectory of the detected object. Further, in some embodiments, prediction subsystem 702b could be configured to predict multiple different possibilities of future states for a detected object (e.g., by predicting the 3 most-likely future trajectories of the detected object). Prediction subsystem 702b may be configured to predict other aspects of a detected object's future behavior as well.

In practice, prediction subsystem 702b may predict a future state of an object detected in the vehicle's surrounding environment in various manners, which may depend in part on the type of detected object. For instance, as one possibility, prediction subsystem 702b may predict the future state of a detected object using a data science model that is configured to (i) receive input data that includes one or more derived representations output by perception subsystem 702a at one or more perception times (e.g., the "current" perception time and perhaps also one or more prior perception times), (ii) based on an evaluation of the input data, which includes state information for the objects detected in the vehicle's surrounding environment at the one or more perception times, predict at least one likely time sequence of future states of the detected object (e.g., at least one likely future trajectory of the detected object), and (iii) output an indicator of the at least one likely time sequence of future states of the detected object. This type of data science model may be referred to herein as a "future-state model."

Such a future-state model will typically be created by an off-board computing system (e.g., a backend platform) and then loaded onto on-board computing system 702, although it is possible that a future-state model could be created by on-board computing system 702 itself. Either way, the future-state model may be created using any modeling technique now known or later developed, including but not limited to a machine-learning technique that may be used to iteratively "train" the data science model to predict a likely time sequence of future states of an object based on training data. The training data may comprise both test data (e.g., historical representations of surrounding environments at certain historical perception times) and associated ground-truth data (e.g., historical state data that indicates the actual states of objects in the surrounding environments during some window of time following the historical perception times).

Prediction subsystem 702b could predict the future state of a detected object in other manners as well. For instance, for detected objects that have been classified by perception subsystem 702a as belonging to certain classes of static objects (e.g., roads, curbs, lane markings, etc.), which generally do not have the potential to move, prediction subsystem 702b may rely on this classification as a basis for predicting that the future state of the detected object will remain the same at each of the one or more future times (in which case the state-prediction model may not be used for such detected objects). However, it should be understood that detected objects may be classified by perception subsystem 702a as belonging to other classes of static objects that have the potential to change state despite not having the potential to move, in which case prediction subsystem 702b may still use a future-state model to predict the future state of such detected objects. One example of a static object class that falls within this category is a traffic light, which generally does not have the potential to move but may nevertheless have the potential to change states (e.g., between green, yellow, and red) while being perceived by vehicle 700.

After predicting the future state of each object detected in the surrounding environment perceived by vehicle 700 at one or more future times, prediction subsystem 702b may then either incorporate this predicted state information into the previously-derived representation of the vehicle's surrounding environment (e.g., by adding data arrays to the data structure that represents the surrounding environment) or derive a separate representation of the vehicle's surrounding environment that incorporates the predicted state information for the detected objects, among other possibilities.

As shown, prediction subsystem 702b may pass the one or more derived representations of the vehicle's surrounding environment to planning subsystem 702c. In turn, planning subsystem 702c may be configured to use the one or more derived representations of the vehicle's surrounding environment (and perhaps other data) to derive a behavior plan for vehicle 700, which defines the desired driving behavior of vehicle 700 for some future period of time (e.g., the next 5 seconds).

The behavior plan that is derived for vehicle 700 may take various forms. For instance, as one possibility, the derived behavior plan for vehicle 700 may comprise a planned trajectory for vehicle 700 that specifies a planned state of vehicle 700 at each of one or more future times (e.g., each second over the next 5 seconds), where the planned state for each future time may include a planned position of vehicle 700 at the future time, a planned orientation of vehicle 700 at the future time, a planned velocity of vehicle 700 at the future time, and/or a planned acceleration of vehicle 700 (whether positive or negative) at the future time, among other possible types of state information. As another possibility, the derived behavior plan for vehicle 700 may comprise one or more planned actions that are to be performed by vehicle 700 during the future window of time, where each planned action is defined in terms of the type of action to be performed by vehicle 700 and a time and/or location at which vehicle 700 is to perform the action, among other possibilities. The derived behavior plan for vehicle 700 may define other planned aspects of the vehicle's behavior as well.

Further, in practice, planning subsystem 702c may derive the behavior plan for vehicle 700 in various manners. For instance, as one possibility, planning subsystem 702c may be configured to derive the behavior plan for vehicle 700 by (i) deriving a plurality of different "candidate" behavior plans for vehicle 700 based on the one or more derived representations of the vehicle's surrounding environment (and perhaps other data), (ii) evaluating the candidate behavior plans relative to one another (e.g., by scoring the candidate behavior plans using one or more cost functions) in order to identify which candidate behavior plan is most desirable when considering factors such as proximity to other objects, velocity, acceleration, time and/or distance to destination, road conditions, weather conditions, traffic conditions, and/or traffic laws, among other possibilities, and then (iii) selecting the candidate behavior plan identified as being most desirable as the behavior plan to use for vehicle 700. Planning subsystem 702c may derive the behavior plan for vehicle 700 in various other manners as well.

After deriving the behavior plan for vehicle 700, planning subsystem 702c may pass data indicating the derived behavior plan to control subsystem 702d. In turn, control subsystem 702d may be configured to transform the behavior plan for vehicle 700 into one or more control signals (e.g., a set of one or more command messages) for causing vehicle 700 to execute the behavior plan. For instance, based on the behavior plan for vehicle 700, control subsystem 702d may be configured to generate control signals for causing vehicle 700 to adjust its steering in a specified manner, accelerate in a specified manner, and/or brake in a specified manner, among other possibilities.

As shown, control subsystem 702d may then pass the one or more control signals for causing vehicle 700 to execute the behavior plan to vehicle-interface subsystem 702e. In turn, vehicle-interface subsystem 702e may be configured to translate the one or more control signals into a format that can be interpreted and executed by components of vehicle-control system 703. For example, vehicle-interface subsystem 702e may be configured to translate the one or more control signals into one or more control messages that are defined according to a particular format or standard, such as a CAN bus standard and/or some other format or standard that is used by components of vehicle-control system 703.

In turn, vehicle-interface subsystem 702e may be configured to direct the one or more control signals to the appropriate control components of vehicle-control system 703. For instance, as shown, vehicle-control system 703 may include a plurality of actuators that are each configured to control a respective aspect of the vehicle's physical operation, such as a steering actuator 703a that is configured to control the vehicle components responsible for steering (not shown), an acceleration actuator 703b that is configured to control the vehicle components responsible for acceleration such as a throttle (not shown), and a braking actuator 703c that is configured to control the vehicle components responsible for braking (not shown), among other possibilities. In such an arrangement, vehicle-interface subsystem 702e of on-board computing system 702 may be configured to direct steering-related control signals to steering actuator 703a, acceleration-related control signals to acceleration actuator 703b, and braking-related control signals to braking actuator 703c. However, it should be understood that the control components of vehicle-control system 703 may take various other forms as well.

Notably, the subsystems of on-board computing system 702 may be configured to perform the above functions in a repeated manner, such as many times per second, which may enable vehicle 700 to continually update both its understanding of the surrounding environment and its planned behavior within that surrounding environment.

Although not specifically shown, it should be understood that vehicle 700 includes various other systems and components as well, including but not limited to a propulsion system that is responsible for creating the force that leads to the physical movement of vehicle 700.

Figure 8:
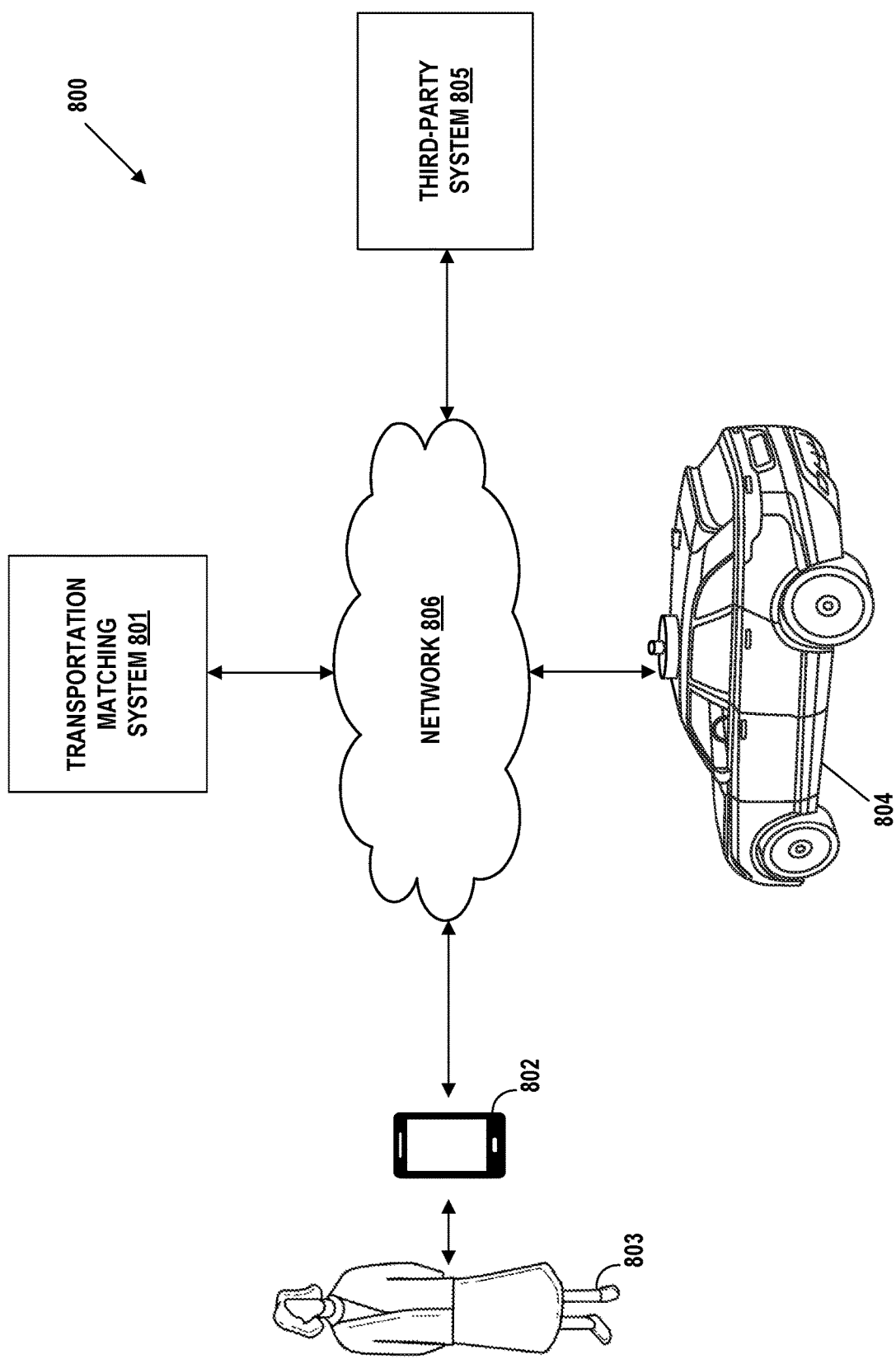
FIG. 8 a simplified block diagram that illustrates one example of a transportation-matching platform.

Turning now to FIG. 8, a simplified block diagram is provided to illustrate one example of a transportation-matching platform 800 that functions to match individuals interested in obtaining transportation from one location to another with transportation options, such as vehicles that are capable of providing the requested transportation. As shown, transportation-matching platform 800 may include at its core a transportation-matching system 801, which may be communicatively coupled via a communication network 806 to (i) a plurality of client stations of individuals interested in transportation (i.e., "transportation requestors"), of which client station 802 of transportation requestor 803 is shown as one representative example, (ii) a plurality of vehicles that are capable of providing the requested transportation, of which vehicle 804 is shown as one representative example, and (iii) a plurality of third-party systems that are capable of providing respective subservices that facilitate the platform's transportation matching, of which third-party system 805 is shown as one representative example.

Broadly speaking, transportation-matching system 801 may include one or more computing systems that collectively comprise a communication interface, at least one processor, data storage, and executable program instructions for carrying out functions related to managing and facilitating transportation matching. These one or more computing systems may take various forms and be arranged in various manners. For instance, as one possibility, transportation-matching system 801 may comprise computing infrastructure of a public, private, and/or hybrid cloud (e.g., computing and/or storage clusters). In this respect, the entity that owns and operates transportation-matching system 801 may either supply its own cloud infrastructure or may obtain the cloud infrastructure from a third-party provider of "on demand" computing resources, such as Amazon Web Services (AWS), Microsoft Azure, Google Cloud, Alibaba Cloud, or the like. As another possibility, transportation-matching system 801 may comprise one or more dedicated servers. Other implementations of transportation-matching system 801 are possible as well.

As noted, transportation-matching system 801 may be configured to perform functions related to managing and facilitating transportation matching, which may take various forms. For instance, as one possibility, transportation-matching system 801 may be configured to receive transportation requests from client stations of transportation requestors (e.g., client station 802 of transportation requestor 803) and then fulfill such transportation requests by dispatching suitable vehicles, which may include vehicle 804. In this respect, a transportation request from client station 802 of transportation requestor 803 may include various types of information.

For example, a transportation request from client station 802 of transportation requestor 803 may include specified pick-up and drop-off locations for the transportation. As another example, a transportation request from client station 802 of transportation requestor 803 may include an identifier that identifies transportation requestor 803 in transportation-matching system 801, which may be used by transportation-matching system 801 to access information about transportation requestor 803 (e.g., profile information) that is stored in one or more data stores of transportation-matching system 801 (e.g., a relational database system), in accordance with the transportation requestor's privacy settings. This transportation requestor information may take various forms, examples of which include profile information about transportation requestor 803. As yet another example, a transportation request from client station 802 of transportation requestor 803 may include preferences information for transportation requestor 803, examples of which may include vehicle-operation preferences (e.g., safety comfort level, preferred speed, rates of acceleration or deceleration, safety distance from other vehicles when traveling at various speeds, route, etc.), entertainment preferences (e.g., preferred music genre or playlist, audio volume, display brightness, etc.), temperature preferences, and/or any other suitable information.

As another possibility, transportation-matching system 801 may be configured to access information related to a requested transportation, examples of which may include information about locations related to the transportation, traffic data, route options, optimal pick-up or drop-off locations for the transportation, and/or any other suitable information associated with requested transportation. As an example and not by way of limitation, when transportation-matching system 801 receives a request for transportation from San Francisco International Airport (SFO) to Palo Alto, California, system 801 may access or generate any relevant information for this particular transportation request, which may include preferred pick-up locations at SFO, alternate pick-up locations in the event that a pick-up location is incompatible with the transportation requestor (e.g., the transportation requestor may be disabled and cannot access the pick-up location) or the pick-up location is otherwise unavailable due to construction, traffic congestion, changes in pick-up/drop-off rules, or any other reason, one or more routes to travel from SFO to Palo Alto, preferred off-ramps for a type of transportation requestor, and/or any other suitable information associated with the transportation.

In some embodiments, portions of the accessed information could also be based on historical data associated with historical transportation facilitated by transportation-matching system 801. For example, historical data may include aggregate information generated based on past transportation information, which may include any information described herein and/or other data collected by sensors affixed to or otherwise located within vehicles (including sensors of other computing devices that are located in the vehicles such as client stations). Such historical data may be associated with a particular transportation requestor (e.g., the particular transportation requestor's preferences, common routes, etc.), a category/class of transportation requestors (e.g., based on demographics), and/or all transportation requestors of transportation-matching system 801.

For example, historical data specific to a single transportation requestor may include information about past rides that a particular transportation requestor has taken, including the locations at which the transportation requestor is picked up and dropped off, music the transportation requestor likes to listen to, traffic information associated with the rides, time of day the transportation requestor most often rides, and any other suitable information specific to the transportation requestor. As another example, historical data associated with a category/class of transportation requestors may include common or popular ride preferences of transportation requestors in that category/class, such as teenagers preferring pop music, transportation requestors who frequently commute to the financial district may prefer to listen to the news, etc. As yet another example, historical data associated with all transportation requestors may include general usage trends, such as traffic and ride patterns.

Using such historical data, transportation-matching system 801 could be configured to predict and provide transportation suggestions in response to a transportation request. For instance, transportation-matching system 801 may be configured to apply one or more machine-learning techniques to such historical data in order to "train" a machine-learning model to predict transportation suggestions for a transportation request. In this respect, the one or more machine-learning techniques used to train such a machine-learning model may take any of various forms, examples of which may include a regression technique, a neural-network technique, a k-Nearest Neighbor (kNN) technique, a decision-tree technique, a support-vector-machines (SVM) technique, a Bayesian technique, an ensemble technique, a clustering technique, an association-rule-learning technique, and/or a dimensionality-reduction technique, among other possibilities.

In operation, transportation-matching system 801 may only be capable of storing and later accessing historical data for a given transportation requestor if the given transportation requestor previously decided to "opt-in" to having such information stored. In this respect, transportation-matching system 801 may maintain respective privacy settings for each transportation requestor that uses transportation-matching platform 800 and operate in accordance with these settings. For instance, if a given transportation requestor did not opt-in to having his or her information stored, then transportation-matching system 801 may forgo performing any of the above-mentioned functions based on historical data. Other possibilities also exist.

Transportation-matching system 801 may be configured to perform various other functions related to managing and facilitating transportation matching as well.

Referring again to FIG. 8, client station 802 of transportation requestor 803 may generally comprise any computing device that is configured to facilitate interaction between transportation requestor 803 and transportation-matching system 801. For instance, client station 802 may take the form of a smartphone, a tablet, a desktop computer, a laptop, a netbook, and/or a PDA, among other possibilities. Each such device may comprise an I/O interface, a communication interface, a GNSS unit such as a GPS unit, at least one processor, data storage, and executable program instructions for facilitating interaction between transportation requestor 803 and transportation-matching system 801 (which may be embodied in the form of a software application, such as a mobile application, web application, or the like). In this respect, the interaction that may take place between transportation requestor 803 and transportation-matching system 801 may take various forms, representative examples of which may include requests by transportation requestor 803 for new transportation events, confirmations by transportation-matching system 801 that transportation requestor 803 has been matched with a vehicle (e.g., vehicle 804), and updates by transportation-matching system 801 regarding the progress of the transportation event, among other possibilities.

In turn, vehicle 804 may generally comprise any kind of vehicle that can provide transportation, and in one example, may take the form of vehicle 700 described above. Further, the functionality carried out by vehicle 804 as part of transportation-matching platform 800 may take various forms, representative examples of which may include receiving a request from transportation-matching system 801 to handle a new transportation event, driving to a specified pickup location for a transportation event, driving from a specified pickup location to a specified drop-off location for a transportation event, and providing updates regarding the progress of a transportation event to transportation-matching system 801, among other possibilities.

Generally speaking, third-party system 805 may include one or more computing systems that collectively comprise a communication interface, at least one processor, data storage, and executable program instructions for carrying out functions related to a third-party subservice that facilitates the platform's transportation matching. These one or more computing systems may take various forms and may be arranged in various manners, such as any one of the forms and/or arrangements discussed above with reference to transportation-matching system 801.

Moreover, third-party system 805 may be configured to perform functions related to various subservices. For instance, as one possibility, third-party system 805 may be configured to monitor traffic conditions and provide traffic data to transportation-matching system 801 and/or vehicle 804, which may be used for a variety of purposes. For example, transportation-matching system 801 may use such data to facilitate fulfilling transportation requests in the first instance and/or updating the progress of initiated transportation events, and vehicle 804 may use such data to facilitate updating certain predictions regarding perceived agents and/or the vehicle's behavior plan, among other possibilities.

As another possibility, third-party system 805 may be configured to monitor weather conditions and provide weather data to transportation-matching system 801 and/or vehicle 804, which may be used for a variety of purposes. For example, transportation-matching system 801 may use such data to facilitate fulfilling transportation requests in the first instance and/or updating the progress of initiated transportation events, and vehicle 804 may use such data to facilitate updating certain predictions regarding perceived agents and/or the collection vehicle's behavior plan, among other possibilities.

As yet another possibility, third-party system 805 may be configured to authorize and process electronic payments for transportation requests. For example, after transportation requestor 803 submits a request for a new transportation event via client station 802, third-party system 805 may be configured to confirm that an electronic payment method for transportation requestor 803 is valid and authorized and then inform transportation-matching system 801 of this confirmation, which may cause transportation-matching system 801 to dispatch vehicle 804 to pick up transportation requestor 803. After receiving a notification that the transportation event is complete, third-party system 805 may then charge the authorized electronic payment method for transportation requestor 803 according to the fare for the transportation event. Other possibilities also exist.

Third-party system 805 may be configured to perform various other functions related to subservices that facilitate the platform's transportation matching as well. It should be understood that, although certain functions were discussed as being performed by third-party system 805, some or all of these functions may instead be performed by transportation-matching system 801.

As discussed above, transportation-matching system 801 may be communicatively coupled to client station 802, vehicle 804, and third-party system 805 via communication network 806, which may take various forms. For instance, at a high level, communication network 806 may include one or more Wide-Area Networks (WANs) (e.g., the Internet or a cellular network), Local-Area Networks (LANs), and/or Personal Area Networks (PANs), among other possibilities, where each such network may be wired and/or wireless and may carry data according to any of various different communication protocols. Further, it should be understood that the respective communication paths between the various entities of FIG. 8 may take other forms as well, including the possibility that such communication paths include communication links and/or intermediate devices that are not shown.

In the foregoing arrangement, client station 802, vehicle 804, and/or third-party system 805 may also be capable of indirectly communicating with one another via transportation-matching system 801. Additionally, although not shown, it is possible that client station 802, vehicle 804, and/or third-party system 805 may be configured to communicate directly with one another as well (e.g., via a short-range wireless communication path or the like). Further, vehicle 804 may also include a user-interface system that may facilitate direct interaction between transportation requestor 803 and vehicle 804 once transportation requestor 803 enters vehicle 804 and the transportation event begins.

It should be understood that transportation-matching platform 800 may include various other entities and take various other forms as well.

Figure 9:
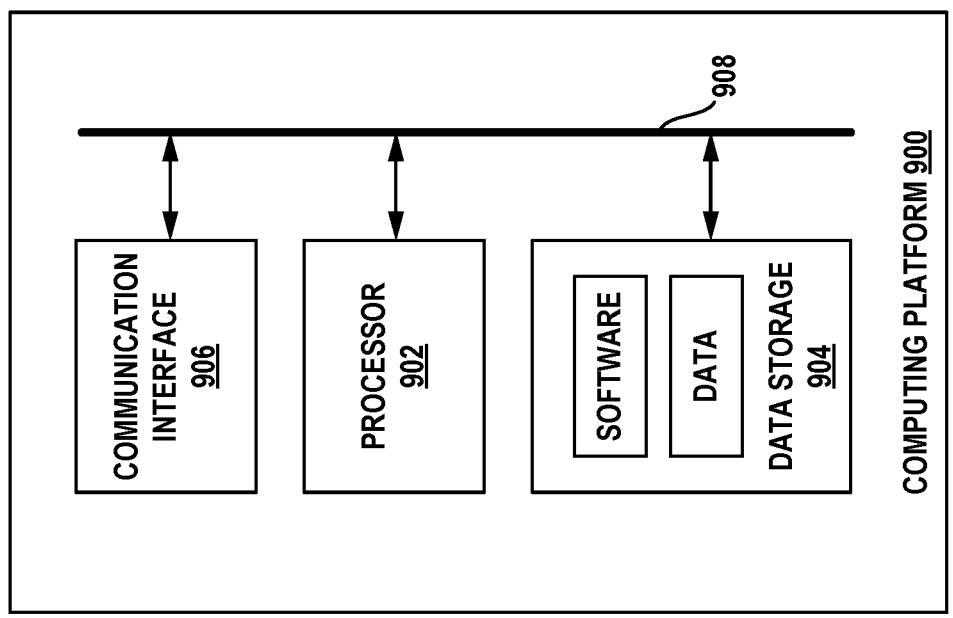
FIG. 9 is a simplified block diagram that illustrates some structural components that may be included in an example computing platform.

Turning now to FIG. 9, a simplified block diagram is provided to illustrate some structural components that may be included in an example computing platform 900, which may be configured to carry out the any of various functions disclosed herein—including but not limited to the functions included in the example data flow described with reference to FIG. 3. At a high level, computing platform 900 may generally comprise any one or more computer systems (e.g., one or more servers) that collectively include at least a processor 902, data storage 904, and a communication interface 906, all of which may be communicatively linked by a communication link 908 that may take the form of a system bus, a communication network such as a public, private, or hybrid cloud, or some other connection mechanism. Each of these components may take various forms.

For instance, processor 902 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 902 could comprise processing components that are distributed across a plurality of physical computing devices connected via a network, such as a computing cluster of a public, private, or hybrid cloud.

In turn, data storage 904 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 904 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 9, data storage 904 may be capable of storing both (i) program instructions that are executable by processor 902 such that the computing platform 900 is configured to perform any of the various functions disclosed herein (including but not limited to any the functions described with reference to FIG. 3), and (ii) data that may be received, derived, or otherwise stored by computing platform 900. For instance, data storage 904 may include one or more of the vehicle sensor data 301, agent tracks 305, motion models 311, uncertainty metrics 312, and/or agent trajectories 313 shown in FIG. 3, among other possibilities.

Communication interface 906 may take the form of any one or more interfaces that facilitate communication between computing platform 900 and other systems or devices. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols, among other possibilities.

Although not shown, computing platform 900 may additionally include one or more input/output (I/O) interfaces that are configured to either (i) receive and/or capture information at computing platform 900 and (ii) output information to a client station (e.g., for presentation to a user). In this respect, the one or more I/O interfaces may include or provide connectivity to input components such as a microphone, a camera, a keyboard, a mouse, a trackpad, a touchscreen, and/or a stylus, among other possibilities, as well as output components such as a display screen and/or an audio speaker, among other possibilities.

It should be understood that computing platform 900 is one example of a computing platform that may be used with the embodiments described herein. Numerous other arrangements are possible and contemplated herein. For instance, other computing platforms may include additional components not pictured and/or more or less of the pictured components.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:
1. A computer-implemented method comprising:
   receiving, at a computing system, sensor data captured by a camera-based sensor system associated with a vehicle in an environment;

processing, by the computing system, the received sensor data and thereby determining a sensor-based track for an agent that is identified within the sensor data, wherein the sensor-based track comprises a time-sequence of sensor-based positions of the agent;

generating, by the computing system, a first updated time-sequence of sensor-based positions of the agent by performing a first optimization operation on the time-sequence of sensor-based positions, wherein the first optimization operation includes processing at least two or more sensor-based positions of the time-sequence of sensor-based positions by beginning with a sensor-based position having a highest confidence in the time-sequence of sensor-based position observations and proceeding in a first direction;

after generating the first updated time-sequence of sensor-based positions, generating, by the computing system, a second updated time-sequence of sensor-based positions of the agent by performing a second optimization operation on the first updated time-sequence of sensor-based positions, wherein the second optimization operation includes processing at least two or more sensor-based positions of the first updated time-sequence of sensor-based positions in a second direction opposite the first direction;

deriving, by the computing system, a trajectory for the agent in the environment based on the second updated time-sequence of sensor-based positions of the agent; and storing the derived trajectory, wherein the derived trajectory is thereafter utilized to perform a task that benefits from increased-accuracy trajectories.

2. The computer-implemented method of claim 1, wherein determining the sensor-based track for the agent comprises:
tracking observations of the agent identified across a series of image frames within the sensor data;
assigning a common agent identifier (ID) to each of the tracked observations of the agent; and
based on the tracked observations comprising the common agent ID, determining the time-sequence of sensor-based positions.

3. The computer-implemented method of claim 2, wherein tracking the observations of the agent identified across the series of image frames within the sensor data comprises:
based on (i) one or more respective prior positions associated with the one or more previous observations of the agent and (ii) a motion model for the agent, determining a predicted position of the agent; and
determining a match between the predicted position of the agent and a future observation of the agent based on:
an intersection of the predicted position of the agent and a future sensor-based position associated with the future observation of the agent; and
a visual matching analysis of the predicted position of the agent with the future sensor-based position associated with the future observation of the agent.

4. The computer-implemented method of claim 1, further comprising:
determining a respective measurement error associated with each sensor-based position in the time-sequence of sensor-based positions that is based on a measured distance of the sensor-based positions from the vehicle; and
incorporating the respective measurement error associated with each sensor-based position into at least the first optimization operation or the second optimization operation.

5. The computer-implemented method of claim 4, wherein the respective measurement error increases quadratically as the measured distance from the vehicle increases.

6. The computer-implemented method of claim 1, further comprising:
augmenting the second updated time-sequence of sensor-based positions to include one or more additional intermediate observations sensor-based positions between each pair of sensor-based positions in the second updated time-sequence of sensor-based positions.

7. The computer-implemented method of claim 6, wherein the sensor data is captured by a stereo camera having a frame rate of 5 frames per second, and wherein augmenting the second updated time-sequence of sensor-based positions comprises increasing a frame rate of the second updated time-sequence of sensor-based positions from 5 frames per second to 30 frames per second.

8. The computer-implemented method of claim 1, wherein beginning with the sensor-based position having the highest confidence in the time-sequence of sensor-based positions and proceeding in the first direction comprises:
determining that one of (i) an earliest position in the time-sequence of sensor-based positions or (ii) a latest position in the time-sequence of sensor-based positions is the sensor-based position of the agent having the highest confidence in the time-sequence of sensor-based positions based on a measured distance of each respective sensor-based position from the vehicle; and
proceeding (i) chronologically forward or (ii) chronologically backward, respectively.

9. The computer-implemented method of claim 1, wherein generating the first updated time-sequence of sensor-based positions of the agent comprises processing at least two or more sensor-based positions of the time-sequence of sensor-based positions by beginning with a position associated with an earliest observation in the time-sequence of sensor-based positions and proceeding chronologically forward; and
wherein generating the second updated time-sequence of sensor-based positions of the agent comprises processing at least two or more sensor-based positions of the first updated time-sequence of sensor-based positions by beginning with a latest sensor-based position and proceeding chronologically backward.

10. The computer-implemented method of claim 1, wherein performing the first optimization operation on the time-sequence of sensor-based positions comprises:
based on (i) an initial sensor-based position in the time-sequence of sensor-based positions and (ii) a motion model for the agent, determining a next predicted sensor-based position for the agent;
based on (i) a next sensor-based position for the agent and (ii) the next predicted sensor-based position for the agent, determining an updated next sensor-based position for the agent having a higher confidence than the next sensor-based position for the agent; and
using the updated next sensor-based position for the agent as a next initial sensor-based position in the time-sequence of sensor-based positions to thereby determine the first updated time-sequence of sensor-based positions.

11. A non-transitory computer-readable medium comprising program instructions stored thereon that are executable to cause a computing system to:
receive, at the computing system, sensor data captured by a camera-based sensor system associated with a vehicle in an environment;
process, by the computing system, the received sensor data and thereby determine a sensor-based track for an agent that is identified within the sensor data, wherein the sensor-based track comprises a time-sequence of sensor-based positions of the agent;
generate, by the computing system, a first updated time-sequence of sensor-based positions of the agent by performing a first optimization operation on the time-sequence of sensor-based positions, wherein the first optimization operation includes processing at least two or more sensor-based positions of the time-sequence of sensor-based positions by beginning with a sensor-based position having a highest confidence in the time-sequence of sensor-based position observations and proceeding in a first direction;
after generating the first updated time-sequence of sensor-based positions, generate, by the computing system, a second updated time-sequence of sensor-based positions of the agent by performing a second optimization operation on the first updated time-sequence of sensor-based positions, wherein the second optimization operation includes processing at least two or more sensor-based positions of the first updated time-sequence of sensor-based positions in a second direction opposite the first direction;
derive, by the computing system, a trajectory for the agent in the environment based on the second updated time-sequence of sensor-based positions of the agent; and
store the derived trajectory, wherein the derived trajectory is thereafter utilized to perform a task that benefits from increased-accuracy trajectories.

12. The computer-readable medium of claim 11, wherein determining the sensor-based track for the agent comprises:
tracking observations of the agent identified across a series of image frames within the sensor data;
assigning a common agent identifier (ID) to each of the tracked observations of the agent; and
based on the tracked observations comprising the common agent ID, determining the time-sequence of sensor-based positions.

13. The computer-readable medium of claim 11, wherein tracking the observations of the agent identified across the series of image frames within the sensor data comprises:
based on (i) one or more respective prior positions associated with the one or more previous observations of the agent and (ii) a motion model for the agent, determining a predicted position of the agent; and
determining a match between the predicted position of the agent and a future observation of the agent based on:
an intersection of the predicted position of the agent and a future sensor-based position associated with the future observation of the agent; and
a visual matching analysis of the predicted position of the agent with the future sensor-based position associated with the future observation of the agent.

14. The computer-readable medium of claim 11, wherein the computer-readable medium further comprises program instructions stored thereon that are executable to cause the computing system to:
determine a respective measurement error associated with each sensor-based position in the time-sequence of sensor-based positions that is based on a measured distance of the sensor-based positions from the vehicle; and
incorporate the respective measurement error associated with each sensor-based position into at least the first optimization operation or the second optimization operation.

15. The computer-readable medium of claim 14, wherein the respective measurement error increases quadratically as the measured distance from the vehicle increases.

16. The computer-readable medium of claim 11, wherein the computer-readable medium further comprises program instructions stored thereon that are executable to cause the computing system to:
augment the second updated time-sequence of sensor-based positions to include one or more additional intermediate sensor-based positions between each pair of sensor-based positions in the second updated time-sequence of sensor-based positions.

17. The computer-readable medium of claim 16, wherein the sensor data is captured by a stereo camera having a frame rate of 5 frames per second, and wherein augmenting the second updated time-sequence of sensor-based positions comprises increasing a frame rate of the second updated time-sequence of sensor-based positions from 5 frames per second to 30 frames per second.

18. The computer-readable medium of claim 11, wherein beginning with the sensor-based position having the highest confidence in the time-sequence of sensor-based positions and proceeding in the first direction comprises:
determining that one of (i) an earliest position in the time-sequence of sensor-based positions or (ii) a latest position in the time-sequence of sensor-based positions is the sensor-based position of the agent having the highest confidence in the time-sequence of sensor-based positions based on a measured distance of each respective sensor-based position from the vehicle; and
proceeding (i) chronologically forward or (ii) chronologically backward, respectively.

19. The computer-readable medium of claim 11, wherein generating the first updated time-sequence of sensor-based positions of the agent comprises processing at least two or more sensor-based positions of the time-sequence of sensor-based positions by beginning with a position associated with an earliest observation in the time-sequence of sensor-based positions and proceeding chronologically forward; and
wherein generating the second updated time-sequence of sensor-based positions of the agent comprises processing at least two or more sensor-based positions of the first updated time-sequence of sensor-based positions by beginning with a latest sensor-based position and proceeding chronologically backward.

20. A computing system comprising:
at least one processor;
a non-transitory computer-readable medium; and
program instructions stored on the non-transitory computer-readable medium that are executable by the at least one processor such that the computing system is capable of:
receiving, at a computing system, sensor data captured by a camera-based sensor system associated with a vehicle in an environment;
processing, by the computing system, the received sensor data and thereby determining a sensor-based track for an agent that is identified within the sensor data, wherein the sensor-based track comprises a time-sequence of sensor-based positions of the agent;

generating, by the computing system, a first updated time-sequence of sensor-based positions of the agent by performing a first optimization operation on the time-sequence of sensor-based positions, wherein the first optimization operation includes processing at least two or more sensor-based positions of the time-sequence of sensor-based positions by beginning with a sensor-based position having a highest confidence in the time-sequence of sensor-based position observations and proceeding in a first direction;

after generating the first updated time-sequence of sensor-based positions, generating, by the computing system, a second updated time-sequence of sensor-based positions of the agent by performing a second optimization operation on the first updated time-sequence of sensor-based positions, wherein the second optimization operation includes processing at least two or more sensor-based positions of the first updated time-sequence of sensor-based positions in a second direction opposite the first direction;

deriving, by the computing system, a trajectory for the agent in the environment based on the second updated time-sequence of sensor-based positions of the agent; and storing the derived trajectory, wherein the derived trajectory is thereafter utilized to perform a task that benefits from increased-accuracy trajectories.

* * * * *